| (12) | United States Patent<br>Labombard et al. | (10) Patent No.: US 12,243,682 B2<br>(45) Date of Patent: Mar. 4, 2025 |
|---|---|---|

(54) DEMOUNTABLE SOLDER JOINTS FOR COUPLING SUPERCONDUCTING CURRENT PATHS

(71) Applicant: Massachusetts Institute of Technology, Cambridge, MA (US)

(72) Inventors: Brian Labombard, Belmont, MA (US); William Beck, Watertown, MA (US); Theodore Mouratidis, Melbourne (AU)

(73) Assignee: Massachusetts Institute of Technology, Cambridge, MA (US)

( * ) Notice: Subject to any disclaimer, the term of this patent is extended or adjusted under 35 U.S.C. 154(b) by 197 days.

(21) Appl. No.: 17/913,459

(22) PCT Filed: Mar. 25, 2021

(86) PCT No.: PCT/US2021/024151
§ 371 (c)(1),
(2) Date: Sep. 22, 2022

(87) PCT Pub. No.: WO2021/257145
PCT Pub. Date: Dec. 23, 2021

(65) Prior Publication Data
US 2023/0207171 A1 Jun. 29, 2023

Related U.S. Application Data

(60) Provisional application No. 63/000,413, filed on Mar. 26, 2020.

(51) Int. Cl.
*H01F 6/06* (2006.01)
*G21B 1/05* (2006.01)

(52) U.S. Cl.
CPC ............. *H01F 6/065* (2013.01); *G21B 1/057* (2013.01)

(58) Field of Classification Search
CPC ......... H01F 6/065; G21B 1/057; Y02E 40/60; Y02E 30/10
See application file for complete search history.

(56) References Cited

U.S. PATENT DOCUMENTS

| 4,268,353 A | 5/1981 | Powell et al. |
| 5,200,391 A * | 4/1993 | Fisher ................ H10N 60/0801 |
| | | 505/704 |

(Continued)

FOREIGN PATENT DOCUMENTS

| GB | 2558685 | 7/2018 |
| GB | 2558685 A | 7/2018 |

(Continued)

OTHER PUBLICATIONS

PCT International Search Report and Written Opinion dated Feb. 9, 2022 for International Application PCT/US2021/024151; 14 Pages.

(Continued)

*Primary Examiner* — William H. Mayo, III
*Assistant Examiner* — Rhadames Alonzo Miller
(74) *Attorney, Agent, or Firm* — Daly, Crowley, Mofford & Durkee, LLP

(57) ABSTRACT

Described are concepts directed toward systems, structures and techniques to create low-resistance, high current capacity, demountable solder joint connections. Such systems, structures and techniques may be used to simultaneously create low-resistance, high current capacity, demountable solder joint connections at multiple locations between no insulation (NI) superconductors and in particular between NI high temperature superconductors (HTS) such as may be used in NI-HTS magnets.

23 Claims, 21 Drawing Sheets

(56) References Cited

U.S. PATENT DOCUMENTS

| | | | |
|---|---|---|---|
| 5,426,408 | A | 6/1995 | Jones et al. |
| 8,437,819 | B2 | 5/2013 | Takayasu et al. |
| 9,117,578 | B2 | 8/2015 | Hahn et al. |
| 9,324,486 | B2 | 4/2016 | Hahn et al. |
| 2019/0267171 | A1* | 8/2019 | Slade ............... H10N 60/203 |
| 2020/0005968 | A1* | 1/2020 | van der Laan ........ H01B 12/04 |
| 2020/0091702 | A1* | 3/2020 | Noonan ................ H01F 6/02 |
| 2020/0168349 | A1* | 5/2020 | Hampshire ............. H01F 6/00 |
| 2020/0194909 | A1* | 6/2020 | Brittles ................ H01R 43/16 |
| 2020/0365304 | A1* | 11/2020 | Slade ................... H01F 41/048 |
| 2021/0319938 | A1* | 10/2021 | Kruip .................... H01F 41/04 |
| 2021/0350957 | A1 | 11/2021 | Takayasu et al. |
| 2021/0375507 | A1 | 12/2021 | Estrada et al. |
| 2022/0013256 | A1 | 1/2022 | Hubbard et al. |
| 2022/0084725 | A1* | 3/2022 | Van Nugteren ...... H10N 60/203 |
| 2022/0148778 | A1* | 5/2022 | Bateman ............... H05H 7/04 |
| 2023/0010097 | A1* | 1/2023 | Brittles ................ H05H 1/16 |

FOREIGN PATENT DOCUMENTS

| | | |
|---|---|---|
| JP | S5835906 | 3/1983 |
| JP | 2013080849 | 5/2013 |
| WO | WO 2017/042543 | 3/2017 |
| WO | WO 2017/042543 A1 | 3/2017 |
| WO | WO 2018/078326 | 5/2018 |
| WO | WO 2018/078326 A1 | 5/2018 |
| WO | WO 2021/113291 | 6/2021 |
| WO | WO 2021/178697 | 9/2021 |
| WO | WO 2021/257145 | 12/2021 |

OTHER PUBLICATIONS

Mei et al.; "Effects of Cooling Rate on Mechanical Properties of Near-Eutectic Tin-Lead Solder Joints"; Journal of Electronic Materials; vol. 20, No. 8; Received Feb. 15, 1991; 10 Pages.

Prasad et al.; "Fabrication of new joints for SST-1 TF coil winding packs"; Fusion Engineering and Design 88; 2013; 5 Pages.

Sorbom et al.; "ARC: A Compact, High-Field, Fusion Nuclear Science Facility and Demonstration Power Plant with Demountable Magnets"; Plasma Science and Fusion Center Massachusetts Institute of Technology; Apr. 20, 2015; 36 Pages.

Suri et al.; "Materials issues in fusion reactors"; $23^{rd}$ National Symposium on Plasma Science & Technology (PLASMA-2008); Journal of Physics: Conference Series 208 (2010) 012001; 17 Pages.

Tsui et al.; "Soldered joints—an essential component of demountable high temperature superconducting fusion magnets"; IOP Publishing; Superconductor Science and Technology; 29 075005; Published May 23, 2016; 17 Pages.

Maeda et al.; "The MIRAI Program and the New Super-High Field NMR Initiative and Its Relevance to the Development of Superconducting Joints in Japan"; IEEE Transactions on Applied Superconductivity; vol. 29, Issue 5; Aug. 2019; 9 Pages.

Mangiarotti et al.; "Design of Demountable Toroidal Field Coils with REBCO Superconductors for a Fusion Reactor"; Department of Nuclear Science and Engineering at Massachusetts Institute of Technology; Feb. 2016; 145 Pages.

Martovetsky et al.; "Qualification of the Joints for the ITER Central Solenoid"; IEEE Transactions on Applied Superconductivity; Sep. 2, 2011; 6 Pages.

Imagawa et al.; "Test of ITER-TF Joint Samples With NIFS Test Facilities"; IEEE Transactions on Applied Superconductivity; vol. 28, No. 3; 2017; 18 Pages.

Yao et al.; "R&D Activities of Joint Manufacture for ITER Poloidal Field Coil"; Plasma Science and Technology; vol. 17, No. 7; 2015; 5 Pages.

Response to Communication Rule 161 EPC dated Nov. 3, 2022 for European Application No. 21794025.3 as filed on May 12, 2023; 12 Pages.

European Communication pursuant to Rules 161 and 162 EPC dated Nov. 3, 2022 for European Patent Application No. 21794025.3; 3 pages.

European Communication pursuant to Rules 161 and 162 EPC dated Sep. 5, 2023 for European Patent Application No. 22704470.8; 3 pages.

Response to European Communication pursuant to Rules 161 and 162 EPC dated Sep. 5, 2023 for European Patent Application No. 22704470.8; Response dated Mar. 5, 2024; 20 pages.

U.S. Preliminary Amendment dated Jun. 29, 2023 for U.S. Appl. No. 18/259,907; 3 pages.

PCT International Search Report and Written Opinion dated May 19, 2022 for International Application No. PCT/US2022/014021; 13 Pages.

* cited by examiner

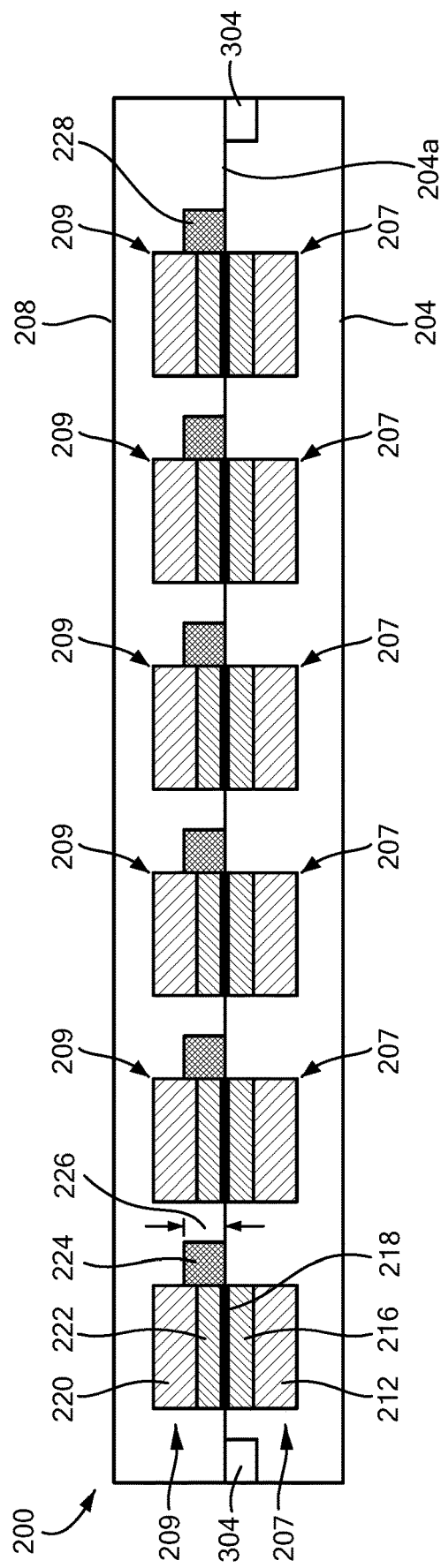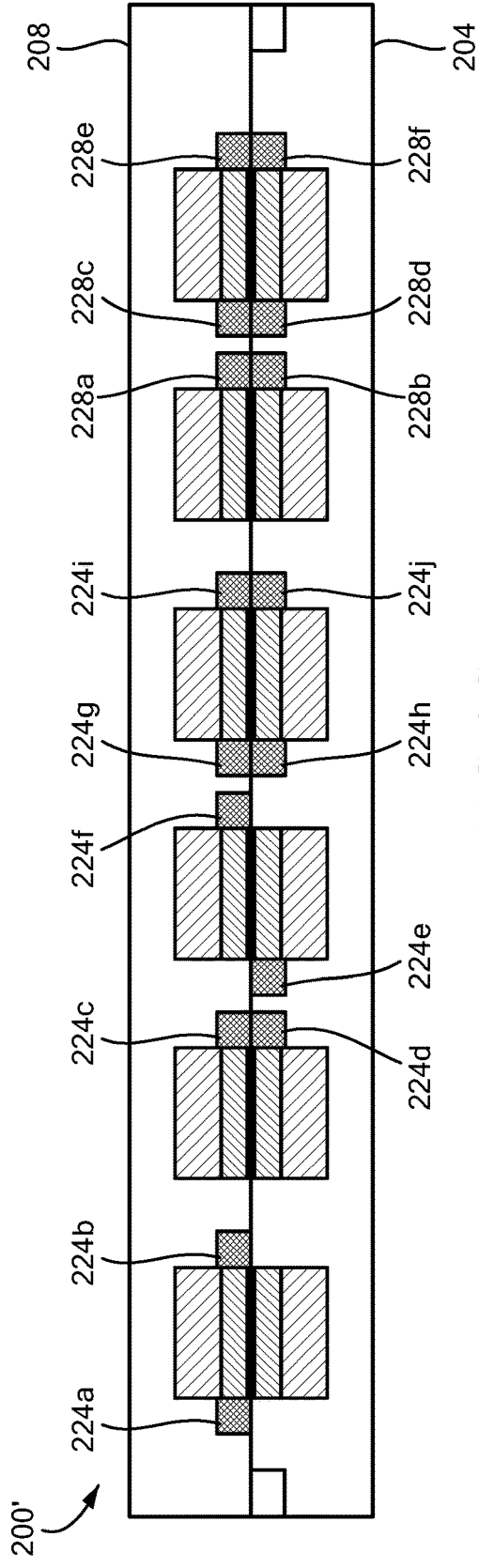
FIG. 2B
FIG. 2C

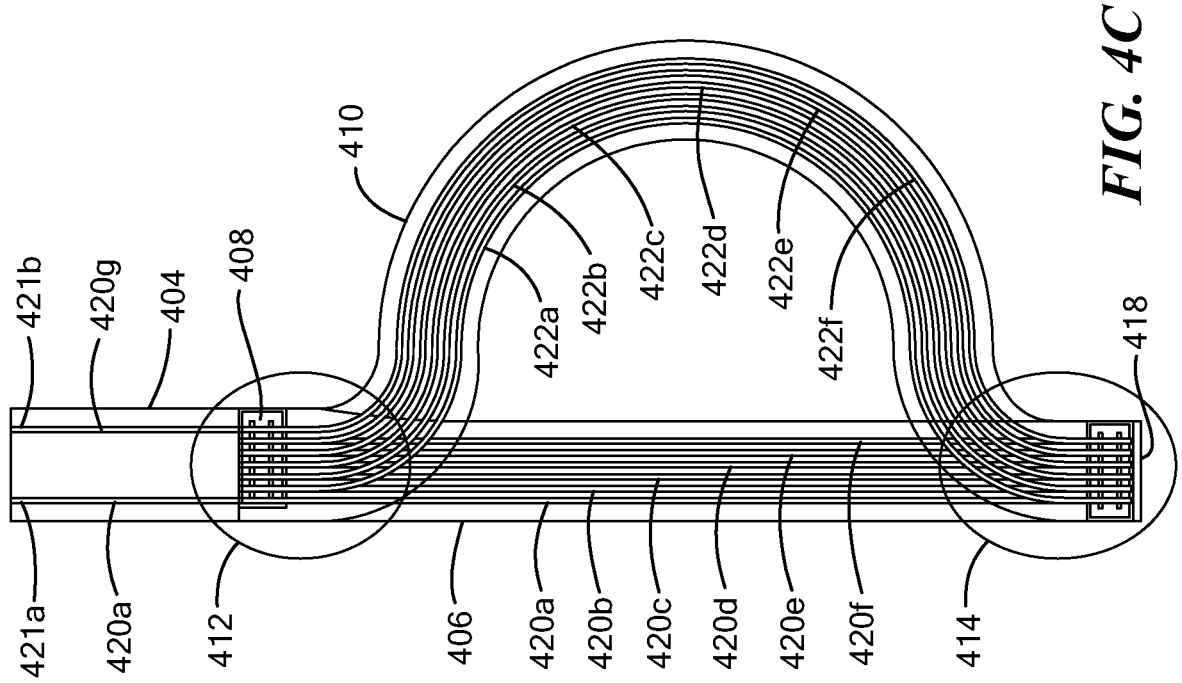
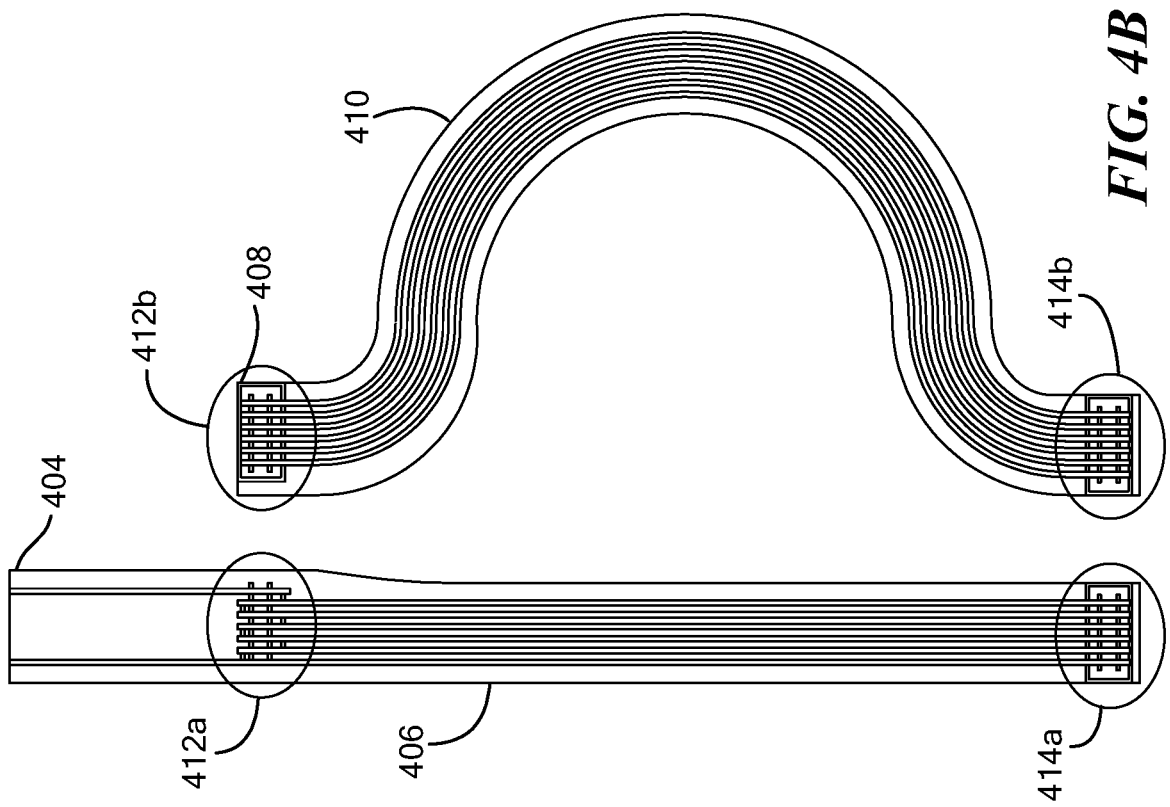

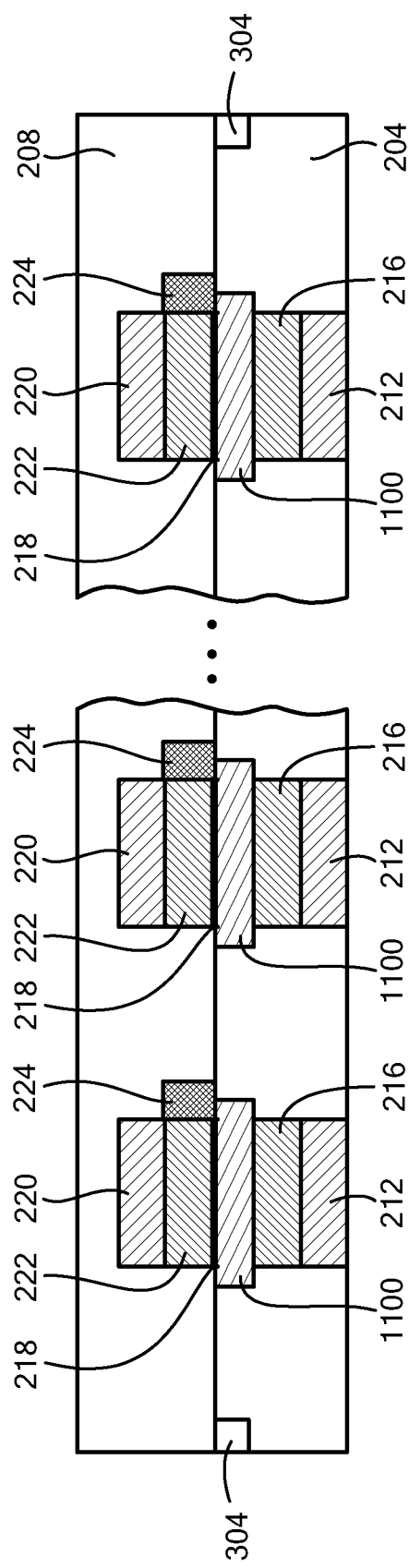
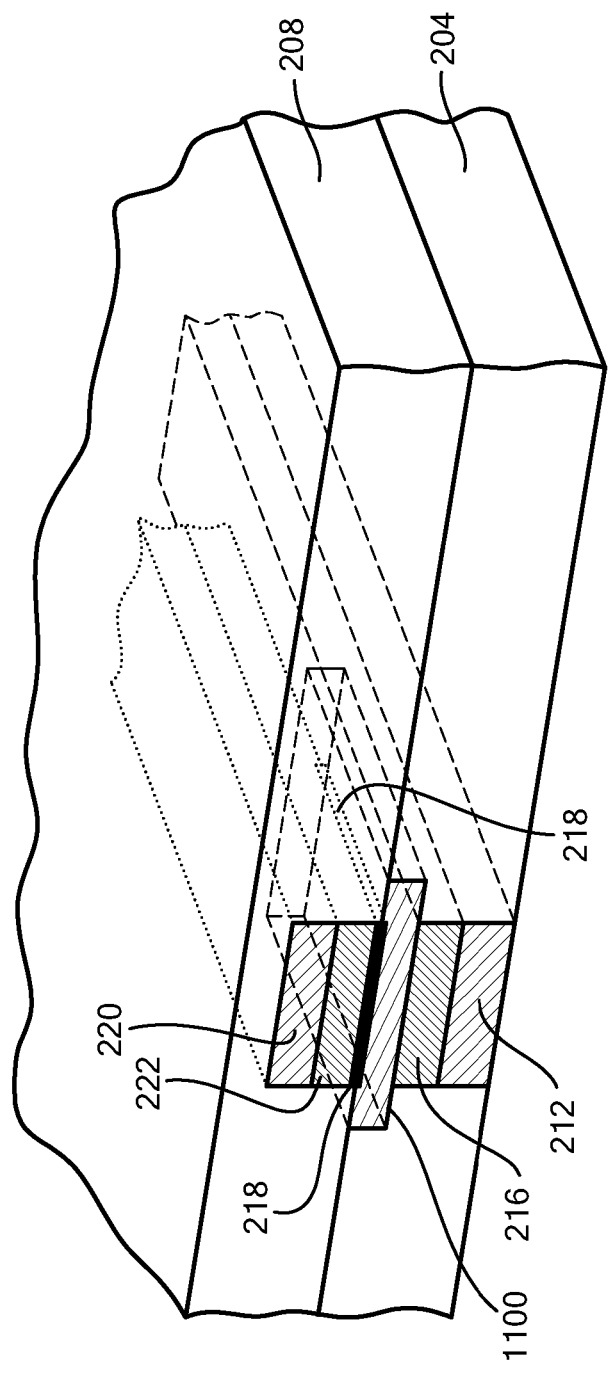
FIG. 11A
FIG. 11B

DEMOUNTABLE SOLDER JOINTS FOR COUPLING SUPERCONDUCTING CURRENT PATHS

CROSS REFERENCE TO RELATED APPLICATIONS

This application is a 371 National Stage Entry of International Patent Application PCT/US2021/024151 filed in the English language on Mar. 25, 2021, which application claims the benefit of U.S. provisional application No. 63/000,413, filed on Mar. 26, 2020, which application is hereby incorporated herein by reference in its entirety.

FIELD

This application is related to the joining of superconducting current paths and, more particularly, to demountable solder joints suitable for joining superconducting current paths.

BACKGROUND

Superconductors are materials that have no electrical resistance to current (are "superconducting") below some critical temperature. For many superconductors, the critical temperature is below 30° K. Thus, operation of these materials in a superconducting state requires significant cooling, such as may be achieved with liquid helium or supercritical helium.

High-field magnets are often constructed from superconductors due to the capability of superconductors to carry a high current without resistance. Such magnets may, for instance, carry currents greater than 5 kA.

SUMMARY

The concepts disclosed herein are generally directed toward systems, structures and techniques to create low-resistance, high current capacity, demountable solder joint connections at multiple locations between superconductors. In embodiments, the concepts, systems, structures and techniques may be used to simultaneously create low-resistance, high current capacity, demountable solder joint connections at multiple locations between non-insulated (or no insulation) (NI) superconductors structures (e.g., coils). Applications include: solder joints at multiple locations within a magnet assembly, solder joints among an array of conductors that comprise a winding pack of a non-insulated superconducting magnet, soldering single isolated joints (e.g., between current leads). In embodiments, the superconductors may be high temperature superconductors (HTS).

As used herein, a "high temperature superconductor" or "HTS" refers to a material that has a critical temperature above 30° K. The critical temperature can in some cases depend on other factors such as the presence of an electromagnetic field. It will be appreciated that where the critical temperature of a material is referred to herein, this may refer to whatever the critical temperature happens to be for that material under the given conditions.

In accordance with one aspect of the concepts, systems, structures and techniques described herein, an assembly comprises arrays of NI-HTS conductors, which are soldered into plates and fastened together via an array of joints. In embodiments, HTS (e.g. in the form of HTS tape stacks) is disposed in channels of the plates and solder connections in the array of joints are made between conductors that run along tops or bottoms of the HTS.

In accordance with a first aspect of the concepts disclosed herein, an apparatus comprises a first plate having a plurality of channels that include a first layer of a high temperature superconductor (HTS) and a first electrically conductive layer over the first layer of the HTS; a second plate having a plurality of channels that include a second layer of the HTS and a second electrically conductive layer over the second layer of the HTS and a layer of solder contacting a portion of the first electrically conductive layer of the first plate and a portion of the second electrically conductive layer of the second plate.

In embodiments, the second plate is disposed over the first plate such that the portion of the first electrically conductive layer is arranged next to the portion of the second electrically conductive layer with the layer of solder between the portion of the first electrically conductive layer and the portion of the second electrically conductive layer, thereby providing an electrically conductive path from the first electrically conductive layer to the second electrically conductive layer.

In embodiments, the first plate comprises at least one solder flow pathway extending from an exterior of the first plate to at least one of the plurality of channels of the first plate.

In embodiments, the first electrically conductive layer is arranged in contact with the first layer of the HTS.

In embodiments, the first plate comprises a stack of layers of the HTS, the stack of layers including the first layer of the HTS.

In embodiments, the at least one solder flow pathway has a path shape that allows solder to flow between the first layer of the HTS in channels of the first plate and the second layer of the HTS in overlapping channels of the second plate.

In embodiments, the plurality of channels of the first plate are arranged next to the plurality of channels of the second plate, with respective portions of the first electrically conductive layer in the plurality of channels of the first plate arranged next to portions of the second electrically conductive layer in the plurality of channels of the second plate.

In embodiments, the layer of solder extends over each of the portions of the first electrically conductive layer in the plurality of channels of the first plate.

BRIEF DESCRIPTION OF THE DRAWINGS

The foregoing features may be more fully understood from the following description of the drawings. It should be appreciated that the figures are not necessarily drawn to scale. In the drawings, each identical or nearly identical component that is illustrated in various figures is represented by a like numeral. For purposes of clarity, not every component may be shown or labeled in every drawing. The drawings aid in explaining and understanding the disclosed technology. Since it is often impractical or impossible to illustrate and describe every possible embodiment, the provided figures depict one or more exemplary embodiments. Accordingly, the figures are not intended to limit the scope of the concepts, systems, structures and techniques sought to be protected.

FIG. 2B is a cross-sectional view taken across lines 2B-2B of FIG. 2A;

FIG. 2C is a cross-sectional view illustrating various possible locations of solder to provide a demountable solder joint;

FIG. 4B is an exploded transparent view of the demountable plate of FIG. 4A;

FIG. 4C is a top transparent view of the demountable plate of FIG. 4A;

FIG. 11A is a cross-sectional view of a demountable joint region comprising a joint plate; and FIG. 11B is a perspective view of a demountable joint region comprising a joint plate.

DETAILED DESCRIPTION

A high-field superconducting magnet often comprises multiple electrically insulated cable turns grouped in a multi-layer arrangement. When a superconductor within the cable is cooled to or below its critical temperature (the temperature below which the electrical resistivity of the superconductor material drops to zero), driving the magnet allows current to pass through the superconducting path without losses. A non-insulated (NI) magnet (also sometimes referred to as a no-insulation (NI) magnet) comprises adjacent superconducting turns which are not insulated from one another but are instead separated by a conventional conductor (i.e., not a superconductor). When the magnet is operating at or below the superconductor's critical temperature, current flows through the superconductor and not across turns because the superconductor has zero resistance compared with the finite resistance of the conductor between the superconducting turns.

No insulation-high temperature superconductor (NI-HTS) magnets may be used in a variety of applications including, but not limited to magnetic resonance imaging (MRI) machines, nuclear magnetic resonance (NMR) equipment, mass spectrometers, particle accelerators, magnetic separation processes, fusion reactors, and the like.

Figure 1A:
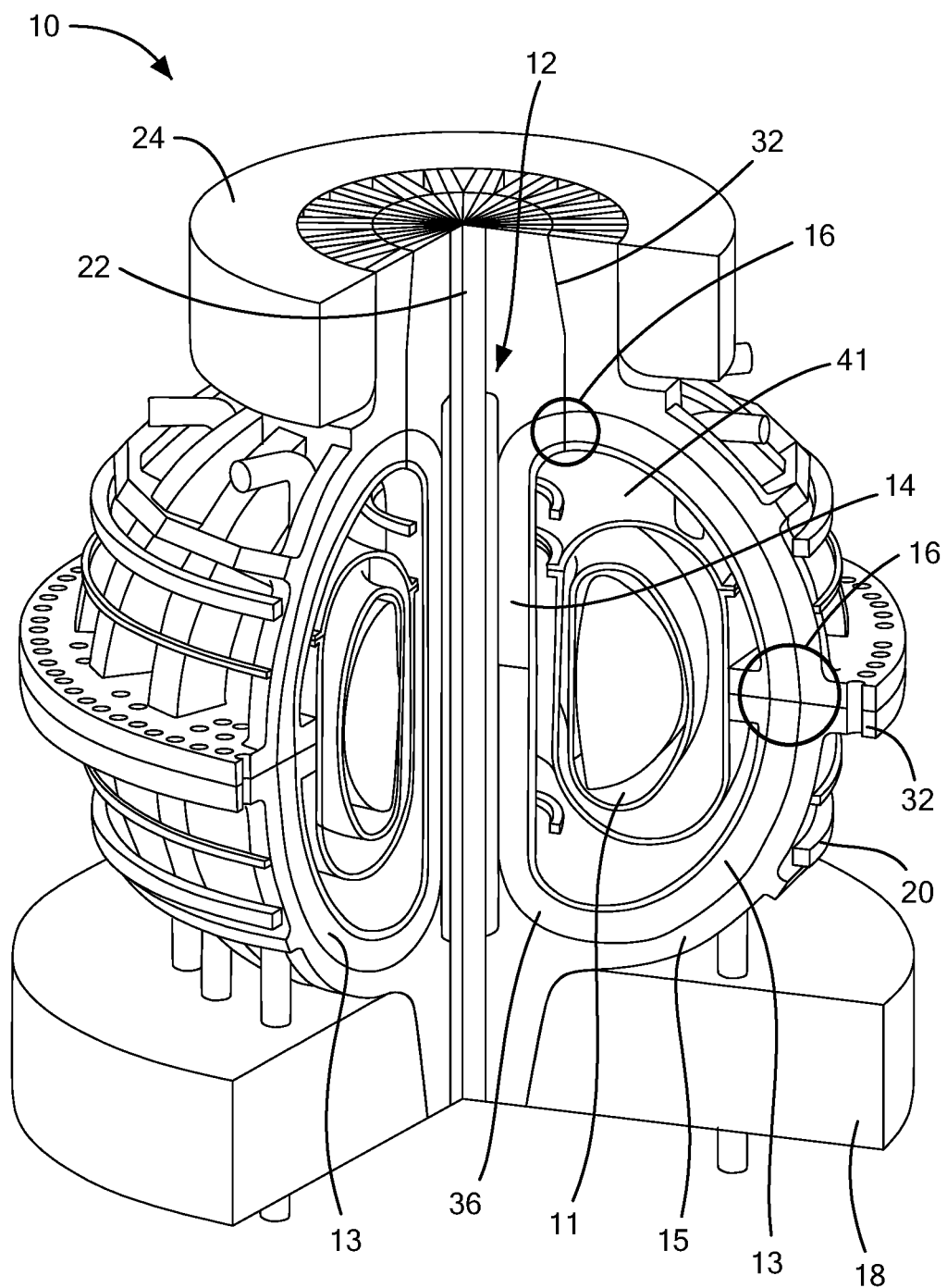
FIG. 1A is an isometric partially sectioned view of a tokamak power plant.

FIG. 1A is a perspective view of a fusion reactor 10 comprising a removable vacuum vessel 11. The vacuum vessel 11 is disposed in a radiation shield (or "shield tank") 41 In this example embodiment, radiation shield 41 is separable having upper and lower halves 41a, 41b. Vacuum vessel 11 and radiation shield are disposed about a central solenoid 12. Separable toroidal field (TF) magnets 13 are disposed about removable vacuum vessel 11. In this example embodiment, the TF magnets are provided as NI-HTS magnets 13 having a D-shape with a straight portion 14 coupled to a curved portion 15 at joint regions 16. As will be described in detail below, and as illustrated in FIG. 1B, the NI-HTS magnets 13 are separable at joint regions 16.

The body of the NI-HTS magnets may be formed from a conductive metal, often in the form of a plate having one or more superconducting current paths provided therein. In embodiments, the superconducting current paths may wind around the D shaped body one or more times forming a looped winding through the NI-HTS magnet. This allows current to flow through the superconductive material around the D-shape to generate a high-strength magnetic field. Not shown in FIGS. 1A and 1B, the reactor may include one or more current drivers coupled to the superconducting current paths of the NI-HTS magnets 12 to drive the current and generate the magnetic field.

In embodiments, the NI HTS magnets 13 may comprise a plurality of plates arranged in a stack and the superconducting current path comprises a conducting channel provided in at least one plate with a high temperature superconductor (HTS) material disposed in the conducting channel. The conducting channel may also have (in addition to the HTS) a conductive material (sometimes referred to as a "co-wind") disposed therein. In embodiments, a conductor (sometimes referred to herein as a conductive layer or a channel cap) may be disposed over the HTS. According to some embodiments, the HTS may comprise a rare earth barium copper oxide superconductor (REBCO), such as yttrium barium copper oxide (YBCO). In some embodiments, the HTS may comprise a co-wound stack of HTS tape. In embodiments, the HTS tape may comprise a long, thin strand of HTS material with cross-sectional dimensions in the range of about 0.001 mm to about 0.1 mm in thickness (or height) and a width in the range of about 1 mm to about 12 mm (and with a length that extends along the length of the conducting channel). According to some embodiments, each strand of HTS tape may comprise an HTS material such as REBCO in addition to an electrically conductive material. In some embodiments, the electrically conductive material may be disposed on the REBCO. In some embodiments, the electrically conductive material may be a cladding material such as copper. In some embodiments, HTS tape may comprise a polycrystalline HTS and/or may have a high level of grain alignment.

Figure 1B:
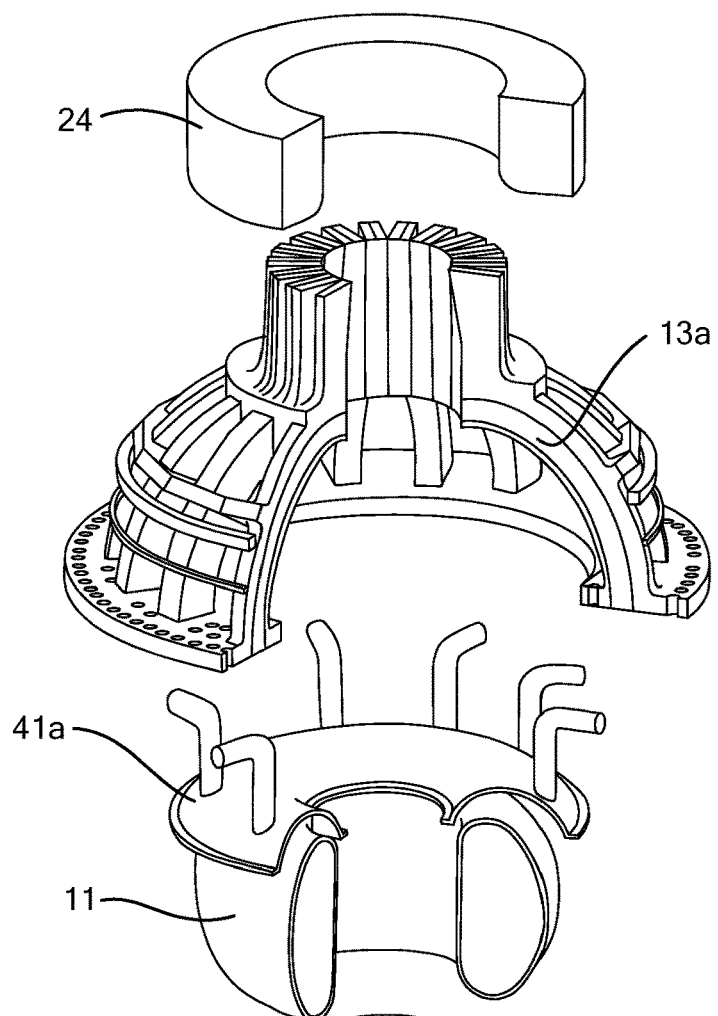
FIG. 1B is an exploded isometric partially sectioned view of the tokamak power plant of FIG. 1A illustrating a toroidal field (TF) magnet having demountable joints.
Figure 1B:
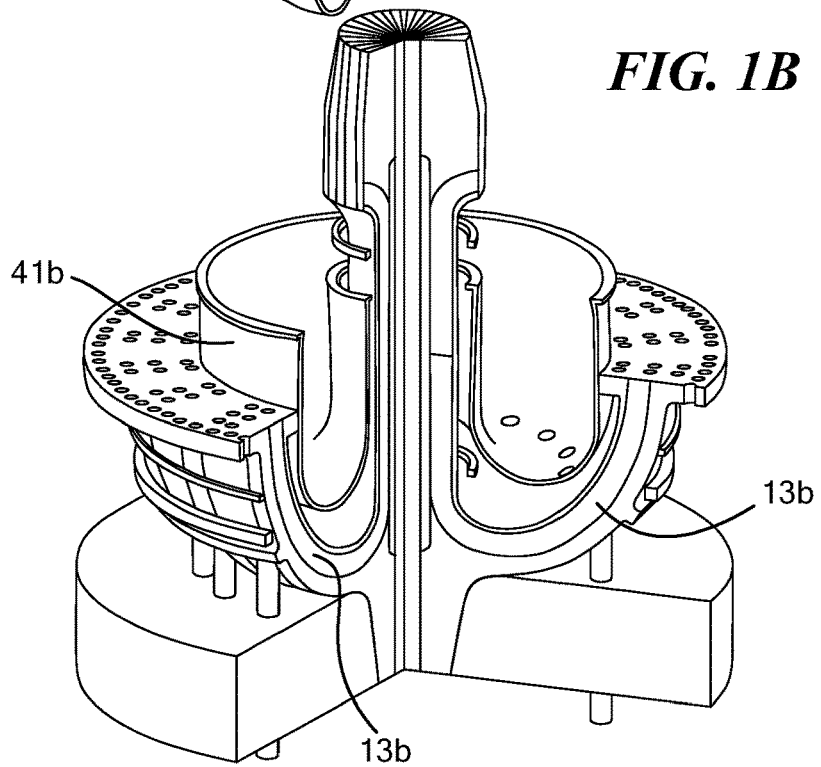

As illustrated in FIGS. 1A, 1B a series of NI-HTS magnets 13 may be placed around central solenoid 12 to form a hollow toroidal shape around the central solenoid.

The removable toroidal vacuum vessel 11 is disposed through the central openings of the D-shaped magnets 13. The reactor 10 may also comprise a base 18, outer walls 20, and a donut-shaped removable retainer ring 24 to structurally secure/retain the vacuum vessel 11 and NI-HTS magnets 13. Outer walls 20 comprises multiple pieces coupled at seams or joints 32. The outer walls 20 may be coupled at seams 32 via a fastening structure such as a bolt ring 34. Thus, outer walls 20 can be separated and taken apart or bolted together.

As seen in the exploded view of FIG. 1B, the reactor 10 may be separated (or dismantled) into multiple sections (or pieces) so that vessel 11 may be removed. To separate the reactor 10, retainer ring 24 is removed (e.g. by lifting or otherwise separating retainer ring from the outer walls 20), and the outer walls 20 are separated at the seams or joints 32 e.g. by removing bolts from the bolt ring 34).

As noted above, NI-HTS magnets 13 have one or more joints (e.g. joints 16) which allow the magnets to be separated (or dismantled) into multiple pieces or plates. In the example shown, the NI-HTS magnet 13 has two joints 16. As will be explained in detail below in conjunction with FIGS. 2A-9, the joints 16 may be provided as demountable solder joints. Thus, by virtue of the demountable solder joints 16, the NI-HTS magnet 13 can be separated into two portions 13a and 13b.

Separating (or dismantling) NI-HTS magnet into multiple pieces allows portions of the NI-HTS magnet to be removed thereby exposing vacuum vessel 11. In this way, vacuum vessel 11 may be lifted out or otherwise removed from the reactor as illustrated in FIG. 1B.

It should, of course, be appreciated that in other embodiments, NI HTS magnet 13 may have more than two joints and the joints may be in regions other than (or in addition to) regions 16 illustrated in FIG. 1A. For example, in some embodiments, the NI-HTS magnets 13 may have a joint at or near position 36. This would allow the curved portion of the magnet 13 to separate from the flat portion 14 so that the NI-HTS magnet can be disassembled and separated from the reactor in a radial direction while the vacuum vessel 30 remains in place. An example of such a radially separable embodiment will be described below in conjunction with FIGS. 10A, 10B, 10C, 10D. In general, however, it should be appreciated that NI-HTS magnets 13 may have one, two, or more joints positioned at any location of the magnet so that the magnet can be disassembled or otherwise separated into a plurality of pieces.

Providing a joint in an NI-HTS magnet can pose challenges because the joint may create a break or discontinuity in the superconducting current path (which in the case of an NI-HTS magnet may be a superconducting HTS channel). Due to the potential for high current running through the superconductor, any joint or interface between two superconducting components (e.g. between two superconducting current paths of an NI HTS magnet) should have sufficiently low resistance so that the joint does not generate undue heat or impede or otherwise disrupt the current flow in the superconducting current path.

Referring now to FIGS. 2A-3G in which like elements are provided having like reference designations throughout the several views, shown is an example of an overlap joint 200 (sometimes more simply referred to as a "lap joint") suitable to couple superconducting current paths 201 disposed in a first (or bottom) plate 204 to superconducting current paths 203 (FIG. 2D) disposed in a second (or top) plate 208. In this example, superconducting current paths 201, 203 are provided by forming channels 202 in respective ones of plates 204, 208 and disposing HTS in the channels. A conductor (or channel cap), which may comprise or may consist of copper, may be disposed over the HTS. Thus, in this example embodiment, the superconducting current paths 201, 203 are provided as HTS superconducting current paths and may sometimes be referred to as "HTS superconducting channels" or more simply "HTS channels" 207, 209.

Figure 2A:
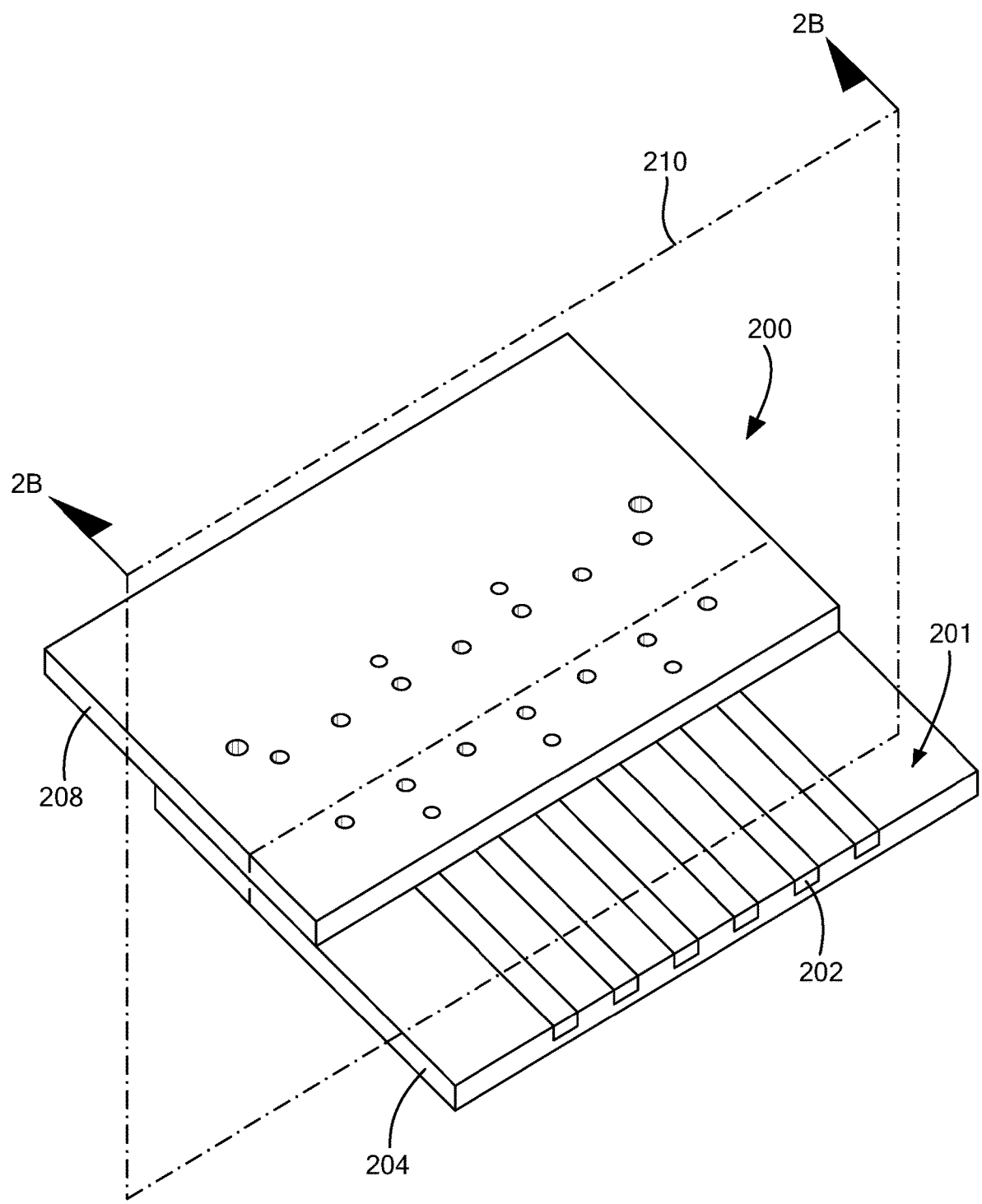
FIG. 2A is an isometric view of top and bottom plates having superconducting current paths joined with a demountable solder joint.

Techniques for forming a lap joint such as that shown in FIG. 2A, are described in conjunction with FIGS. 2B-3G. However, regardless of the particular manner in which a lap joint is formed, such a lap joint 200 can be provided between sections of a magnet (e.g. the NI-HTS magnet 13 in FIGS. 1A, 1B) to form an electrical connection between the superconducting channels on one side of the joint 200 (i.e. the HTS channels 207 (FIG. 2B) in bottom plate 204) and the superconducting channels on the other side of the joint 200 (i.e. the HTS channels 209 (FIG. 2B) in top plate 208). The overlapping portions of bottom plate 204 and top plate 208 form a joint region, i.e. an area or region where two (or more) plates can be joined. As will be discussed below, the electrical connection between the HTS superconducting channels 207, 209 may be formed through the introduction of a layer of solder 218 (FIG. 2B) between the HTS superconducting channels 207, 209. Such a solder connection (or solder joint) both mechanically couples the plates 204, 208 and electrically couples the HTS superconducting channels 207 and 209. The solder used to form solder layer 218 introduced between the superconducting channels 207, 209, is sometimes referred to herein as "joint solder."

In embodiments, HTS may be soldered into one or more channels of the plates to form the HTS superconducting channels 207, 209. That is, HTS may be secured in the channels of bottom plate 204 via solder to form the HTS superconducting channels 207 in the bottom plate 204 and HTS may be secured in the channels of top plate 208 via solder to form the HTS superconducting channels 209 in the top plate.

In the case where HTS (or any superconducting material) is soldered into a channel of a plate, the joint solder 218 introduced between the superconducting channels 207, 209, which electrically and mechanically couples the superconducting channels 207, 209 has a melting temperature (e.g. a liquidus) lower than the melting temperature (e.g. a liquidus) of the solder used to secure HTS into the channels (sometimes referred to herein as "HTS solder") to form the superconducting channels 207, 209. Thus, the joint solder may be referred to as a "low temperature solder" meaning that the joint solder has a liquidus lower than the liquidus of the HTS solder. Accordingly, in embodiments, a first type of solder may be used in the HTS superconducting channels and a second, different type of solder may be used to form a solder layer or solder joint between HTS conductors 207, 209 in the first and second the plates. Thus, stated simply, the HTS solder may be different than the joint solder.

FIG. 2B is a cross-sectional view of the assembled joint 200 as seen from plane 210 in FIG. 2A. The bottom plate 204 has a plurality of (here, six) HTS superconducting channels 207 that wind through the plate. In this example, each HTS superconducting channel 207 comprises a superconducting material 212 running the length of the channel and an electrically conductive layer 216 (also referred to as a channel cap layer or more simply a channel cap) that covers the superconducting material. In some embodiments, channel cap 216 is substantially flush with surface 204a of plate 204 while in other embodiments, channel cap 216 may be recessed with respect to surface 204a with the plate 204.

Similarly, the HTS superconducting channels 209 in the top plate 208 also include superconducting material 220 having a channel cap 222 disposed thereover. In some embodiments, channel cap 222 is substantially flush with surface 208a (FIG. 2D) of plate 208 while in other embodiments, channel cap 222 may be recessed with respect to surface 208a with the plate 208.

The superconducting material 212, 220 may be a high-temperature superconducting (HTS) material, such as a rare-earth barium copper oxide (REBCO) material, and the channel cap 216, 222 may be provided from a conductive material such as copper. The plates 204 and 208 may comprise any electrically conductive metal or any electrically conductive material. According to some embodiments, the plates may comprise, or may consist of, a high mechanical strength material such as but not limited to steel, Inconel®, Nitronic® 40, Nitronic® 50, Incoloy®, or combinations thereof. In some embodiments, the plates may be plated with a metal such as nickel to facilitate adhesion of other components to the plate, including solder as described below. As noted above, HTS (and any co-wind material and/or channel cap) may be soldered into one or more channels of the plates using a first solder type to form the HTS superconducting channels 207, 209.

A solder channel 224 (FIG. 2D) also referred to as a "solder flow channel," "solder pathway" or "solder path" follows a path through a region of the top plate and along and among the superconducting channel 207 where a joint will be formed. Solder channel 224 is used to deliver solder layer 218 to the interface between superconducting channels in the first and second plates. Although the example embodiment of FIGS. 2A-2C illustrate solder channel 224 as a single continuous channel having a serpentine shape, in embodiments, two or more separate solder channels may be used. For example, individual solder channels may be provided adjacent each superconducting channel.

In some embodiments, solid solder material may be placed into some or all solder channels prior to joining the plates together. This eliminates the need to connect the channels together via a solder channel and deliver the required amount of solder in liquid form.

In embodiments, a vacuum pressure injection ("VPI") process may be used to introduce solder 218 into the solder channel(s) 224 and subsequently to the interface between superconducting channels 207, 209 in the first and second plates. As noted above, the solder may provide electrical connections between the superconducting channels 207, 209 and may mechanically secure the plates to each other. In embodiments, rather than using a VPI approach, solid solder can be placed into channels or pockets aside or adjoining the joint pads to be soldered, prior to joint assembly.

The top plate 208 has several superconducting channels 209 that are aligned to and interface with (e.g. make contact with) the superconducting channels 207 of bottom plate 204. Solder 218 is disposed between the channels 207, 209 to form a solder bond (or solder joint) between the channels 207, 209. The solder bond provides an electrical connection between the superconducting channels 207, 209 having a resistance which is low enough to allow the high current in the superconductors to pass from one superconducting channel (e.g. channel 207), through the solder 218, to the other superconducting channel (e.g. channel 209). The solder 218 also provides a mechanical bond between the plates to help secure the plates together.

In embodiments, the joint solder (e.g. solder used to for, solder layer 218) is a second, different type of solder than that used to solder or otherwise secure HTS into the plate channels. In embodiments, the joint solder has a liquidus lower than the liquidus of the solder used to secure HTS into channels of a plate. Thus, the joint solder is referred to as a low-temperature solder meaning that the solder has a melting point temperature which is lower than the melting point temperature of the solder used to secure HTS into the plate channels.

By using a low temperature solder as the joint solder, the plates can be disassembled without also disassembling the HTS from the plate channels. In embodiments, the low-temperature solder may comprise a lead solder, a lead-free solder, a gallium or gallium-alloy solder, a $Sn_{60}Pb_{40}$ solder, a tin-lead solder, or any type of solder that can provide a mechanical junction and electrical connection between the superconducting channels.

As will be discussed below, in embodiments in which solder 218 comprises a low-temperature solder, heat may be applied to the plates in at least the joint region 200 until the temperature of the joint solder 218 is raised close to or above the solder's melting point. When the solder transitions from its solid to state to a pasty or liquid state, the mechanical joint is broken, and the plates 204, 208 can be separated. Since the melting point of the joint solder occurs at a temperature which is lower than the melting point of temperature of the HTS solder, the plates 204, 208 can be separated (or otherwise disassembled) without damaging the HTS and also without separating (or dissembling, disturbing, or otherwise disrupting) the HTS from the plate channels.

The depth 226 of the solder channel 224 may be greater than the depth of the copper cap 216 so that the solder makes direct contact with the superconducting material 212. In other embodiments, some or all sections of the solder channel 224 may have a depth that is less than the depth of the copper cap, as shown by section 228 of the solder channel.

FIG. 2C shows various possible locations of solder channels 224a-224j, 228a-228f in plates 204, 208. It should be understood that reference numerals 224a-224j, 228a-228f may also represent locations at which solder may be disposed to form a solder joint 218 between HTS disposed in plates 204, 208.

As illustrated in FIG. 2C, one or more solder channels may be provided in one or both of plates 204, 208. Thus, solder channels may be disposed on one side of an HTS channel (e.g. as illustrated by solder channel 224 in FIG. 2B) or on both sides of an HTS channel (e.g. as illustrated by solder channels 224a, 224b in FIG. 2C). Also, a single solder channel may be provided in plate 204 opposite a single solder channel in plate 208 (e.g. as illustrated by solder channels 224c, 224d in FIG. 2C). In still other embodiments, a single solder channel may be provided in plate 204 on one side of an HTS channel in plate 204 and a single solder channel may be provided in plate 208 on an opposite side of an HTS channel (e.g. as illustrated by solder channels 224e, 224f in FIG. 2C). In still other embodiments, a multiple solder channels may be provided on both sides of an HTS channel in plate 204 and multiple solder channels may be provided on both sides of an HTS channel in plate 208 (e.g. as illustrated by solder channels 224g 228j in FIG. 2C). Also, solder channels having a reduced height 228a-228f may be disposed in any configuration illustrated FIG. 2C.

In summary, solder and/or solder channels may be disposed in a variety of different configurations/locations in one or multiple plates and it should be appreciated that various different combinations may be used. After reading the disclosure provided herein, one of ordinary skill in the art will appreciate how to select one or more locations at which to place solder and/or at which to place solder channels.

Figure 2D:
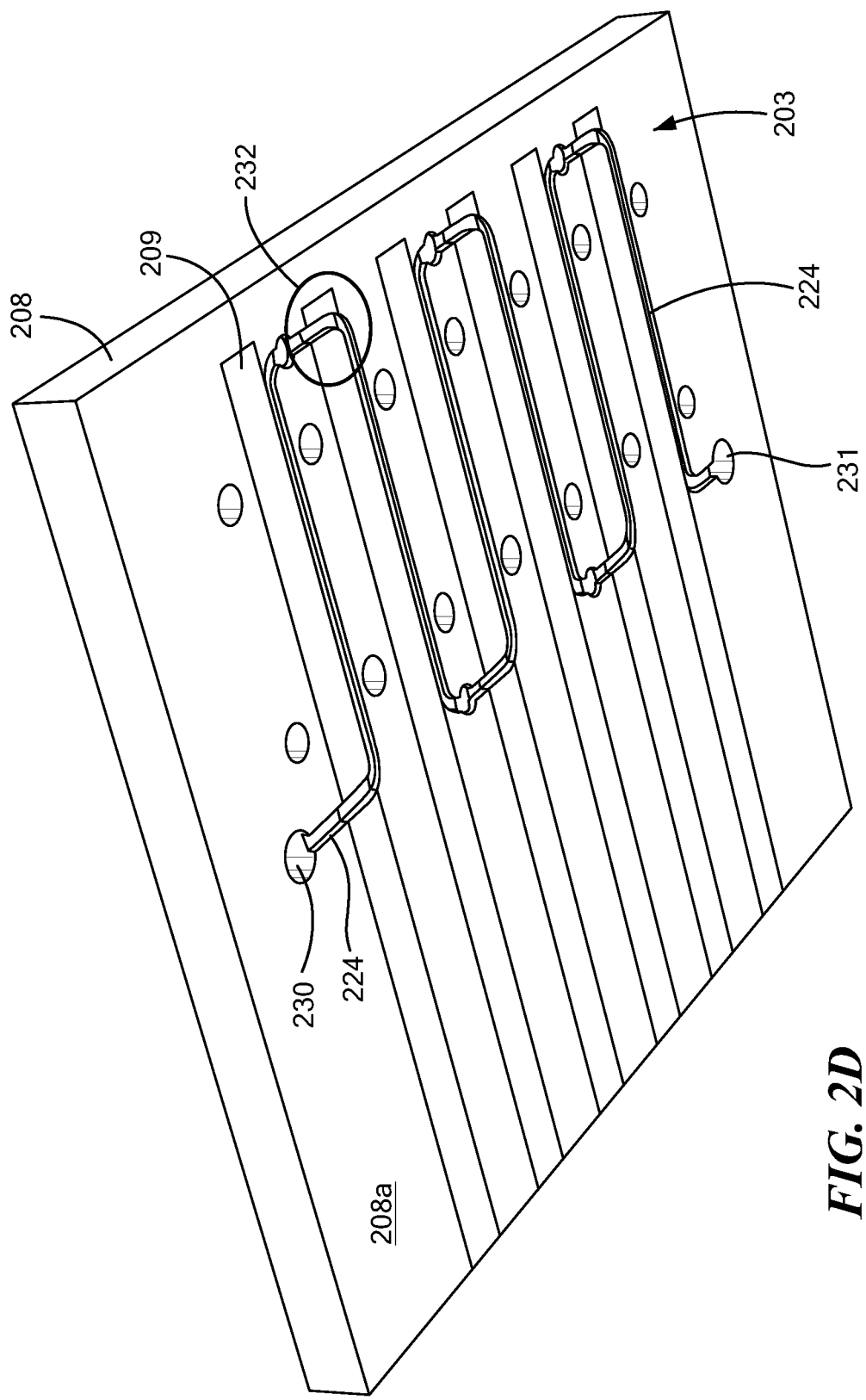
FIG. 2D is an isometric view of the top plate of FIG. 2A.

Referring to FIG. 2D, a perspective view of top plate 208 shows the bottom surface 208a of the plate (i.e., the surface of plate 208 disposed over the surface 204a of bottom plate 204). As shown, in this example the solder channel 224 is provided in the top plate 208 and has a serpentine path shape which extends from a first solder port 230, along the superconducting channels 206, to a second solder port 231. Thus, a first end of the solder channel 224 is coupled to solder port 230 and a second, opposite end of solder channel 224 is coupled to solder port 231.

Solder channel 224 also runs through (or intersects) superconducting channels 209 at multiple locations (e.g. at location 232) so that when the solder channel is filled with solder it creates a direct electrical connection between the solder and the superconducting channel 209. In embodiments, solder channel 224 may be a recess in the top plate. In embodiments, the solder channel may be a recess in the bottom plate. In still other embodiments, the solder channel may be formed from recesses in both the top and bottom plates. Regardless of the particular manner in which one or more solder channels are formed, the solder channel(s) become closed channel(s) when the top and bottom plates are mated together.

Figure 3A:
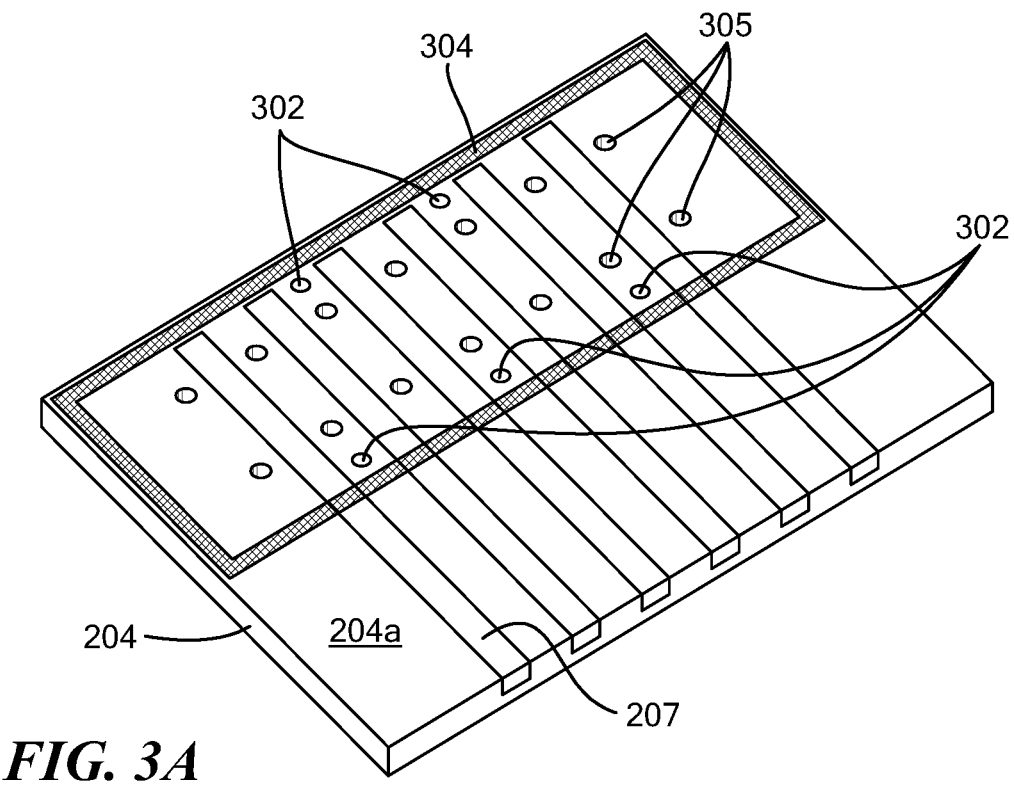
FIG. 3A is an isometric view of the bottom plate in FIGS. 2A, 2B having a gasket disposed over a surface thereof.

FIGS. 3A-3G illustrate an example vacuum pressure injection (VPI) process for forming solder joints between the superconducting channels 207, 209 (FIG. 2D). In FIG. 3A, a gasket 304 is placed or otherwise disposed or formed on surface 204a of bottom plate 204 around the area where the solder channel 224 (FIG. 2D) is formed. In embodiments, the bottom plate 204 and/or the top plate 208 may include a recess into which the gasket 304 fits. The gasket helps to form a vacuum seal around the solder path. Gasket materials may include silicon rubber, Viton®, Teflon®. Those of ordinary skill in that art will appreciate, of course, that any material suitable for forming a vacuum seal may be used.

Bottom plate 204 comprises holes 302 disposed to intercept the path that the solder will follow (e.g. the solder flow channel). As will become apparent after reading the description of FIG. 3E below, once the solder is in place and solidified, conductive paths (or solder "bridges") may exist between the superconducting current paths. Thus, holes 302 are positioned above portions of solder bridges between superconducting current paths.

Hole 302 provide access points through which solder bridges may be cut or otherwise broken via mechanical techniques, chemical techniques or any other technique. Once the solder bridge is cut, the superconducting channels 207 are not electrically connected to each other through one or more solder bridges.

Figure 3B:
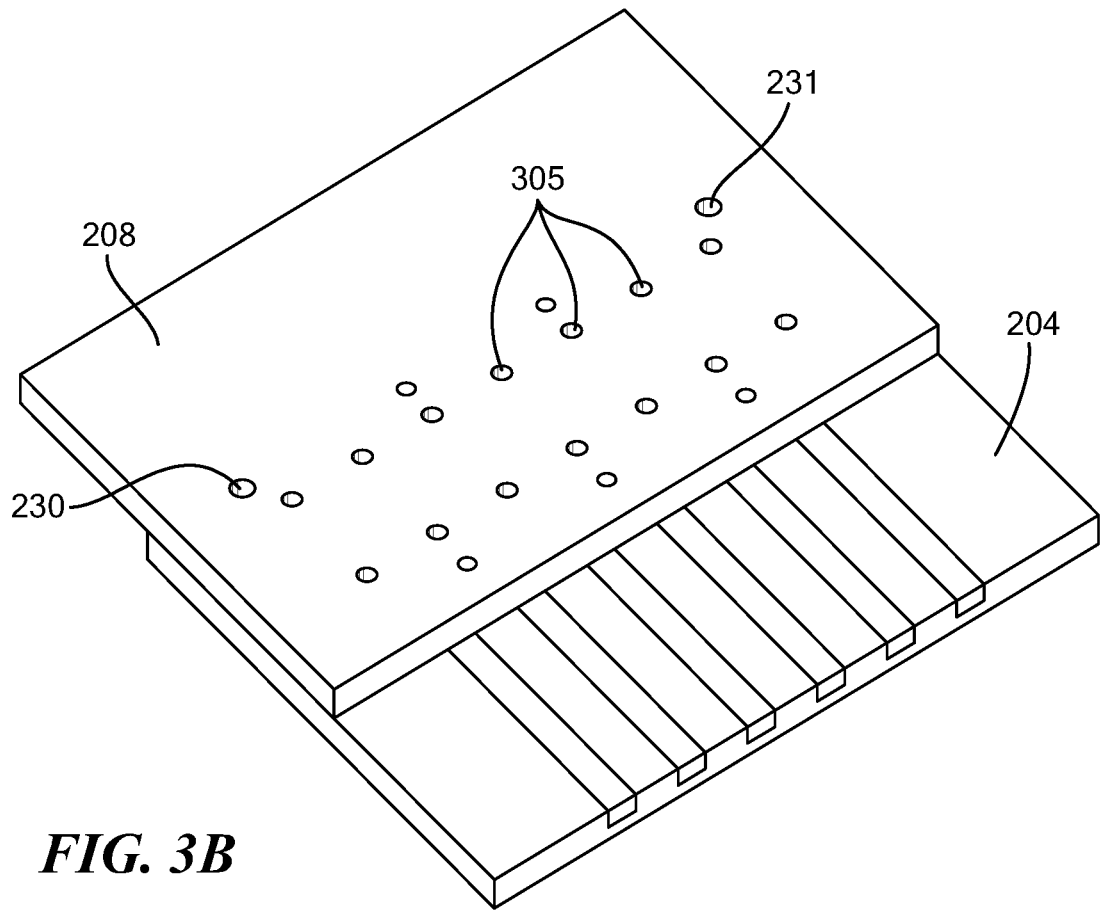
FIG. 3B is an isometric view of top and bottom plates having superconducting current paths joined with a demountable solder joint.

In embodiments, bolt holes 305 may be drilled and tapped in bottom plate 204 to provide the holes as threaded bolt holes. In FIG. 3B, top plate 208 is disposed over bottom plate 204 such that at least portions of top plate 208 are aligned with and overlap at least portions of bottom plate 208. Top plate 208 also has bolt holes 305 that align with bolt holes 305 of bottom plate 204 to allow the plates to be bolted together during a soldering process.

Figure 3C:
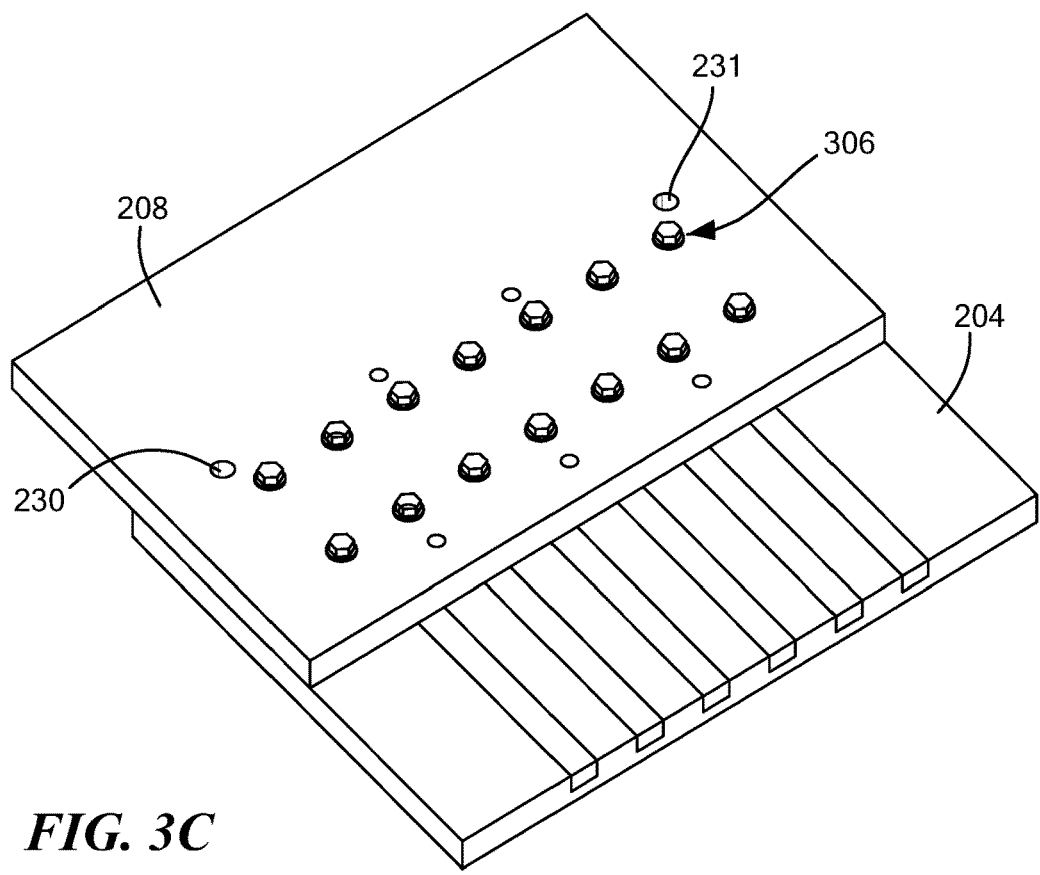
FIG. 3C is an isometric view of the top and bottom plates of FIG. 3B coupled together using bolts.

Referring to FIG. 3C, the top plate is secured (e.g. coupled or otherwise attached) to the bottom plate to form (together with gasket 304) the vacuum seal between the plates. In this example, bolts 306 are used to secure the plates together. However, in other instances, a press or clamp could be used. As the bolts are tightened, the bottom plate 204 and top plate 208 press together with the gasket 304 between them, forming a vacuum seal between the plates. Any openings in the bolt regions may also be sealed by using a fluid-tight sealant or tape around the threads and/or the heads of the bolts so that air or other fluids cannot escape or enter the vacuum sealed area through the bolt threads.

Figure 3D:
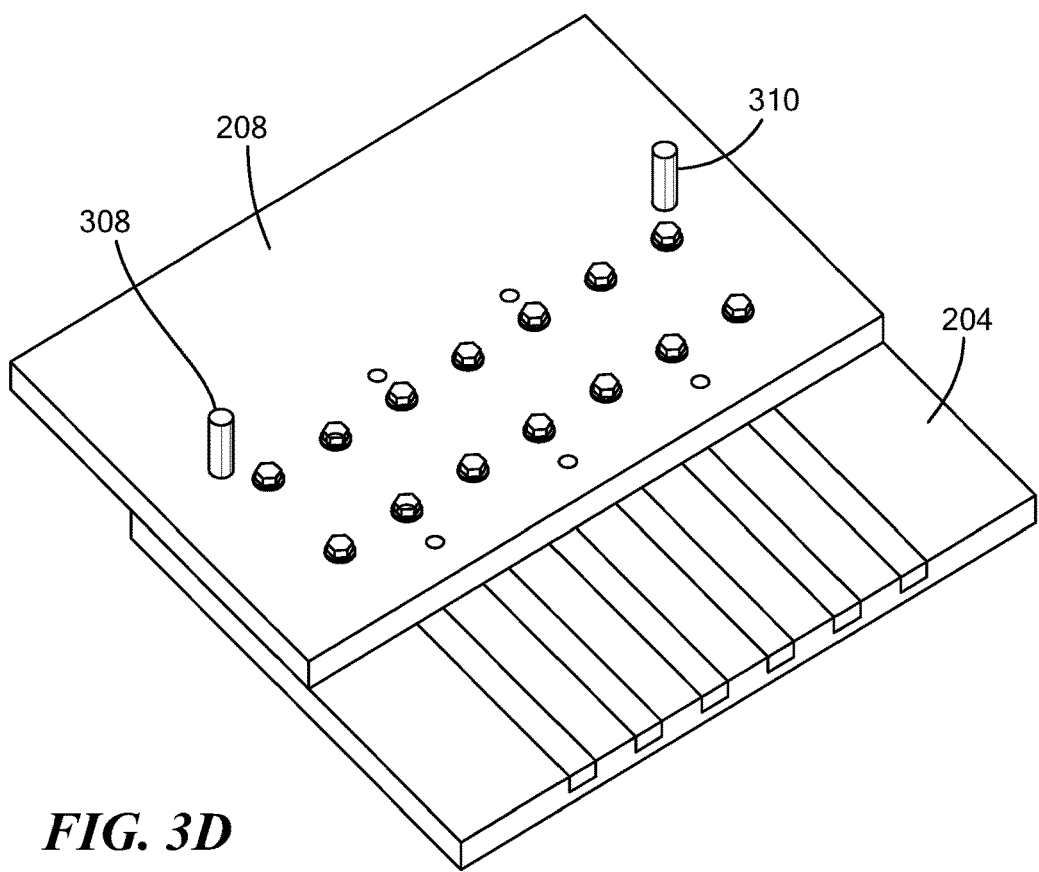
FIG. 3D is an isometric view of the top and bottom plates of FIG. 3B coupled together with a solder inlet and outlet.

In FIG. 3D, a solder inlet 308 and outlet 310 are coupled to the solder ports 230 and 231. The inlet 308 and outlet 310 are effectively pipes. At the inlet 308, molten solder is introduced into the pipe. At the outlet 310, a vacuum is applied in the joint region such that molten solder is drawn through inlet 308, through the solder channel (e.g. solder channel 224 in FIG. 2D). Once solder is observed exiting the solder channel through outlet 310, the solder channel is filled. Also, during the process, at least the joint regions of the bottom and top plates 204, 208 may be heated to a temperature close to, at or above the melting point of the joint solder 218 but below the melting point of the HTS solder so that the joint solder 218 can flow through the solder channel without solidifying while the HTS solder is exposed to temperatures below its liquidus and thus remains in a solid state.

In embodiments, an inner diameter (ID) of the pipes should be larger in size than ID of the solder channels (e.g. the serpentine solder channels) with which they are in fluid communication to facilitate flow of molten metal (e.g. solder) with acceptable overall system pressure drop. Locations of the inlet and outlet pipes should be chosen to facilitate physical connections. An end of the inlet and outlet pipes may be threaded to match threaded holes in the plate which are open to the solder channel to facilitate connections between the inlet/outlet pipes and the solder channels. Other means for making a fluid connection leading from the inlet/outlet pipes to the solder channel may also be used.

Figure 3E:
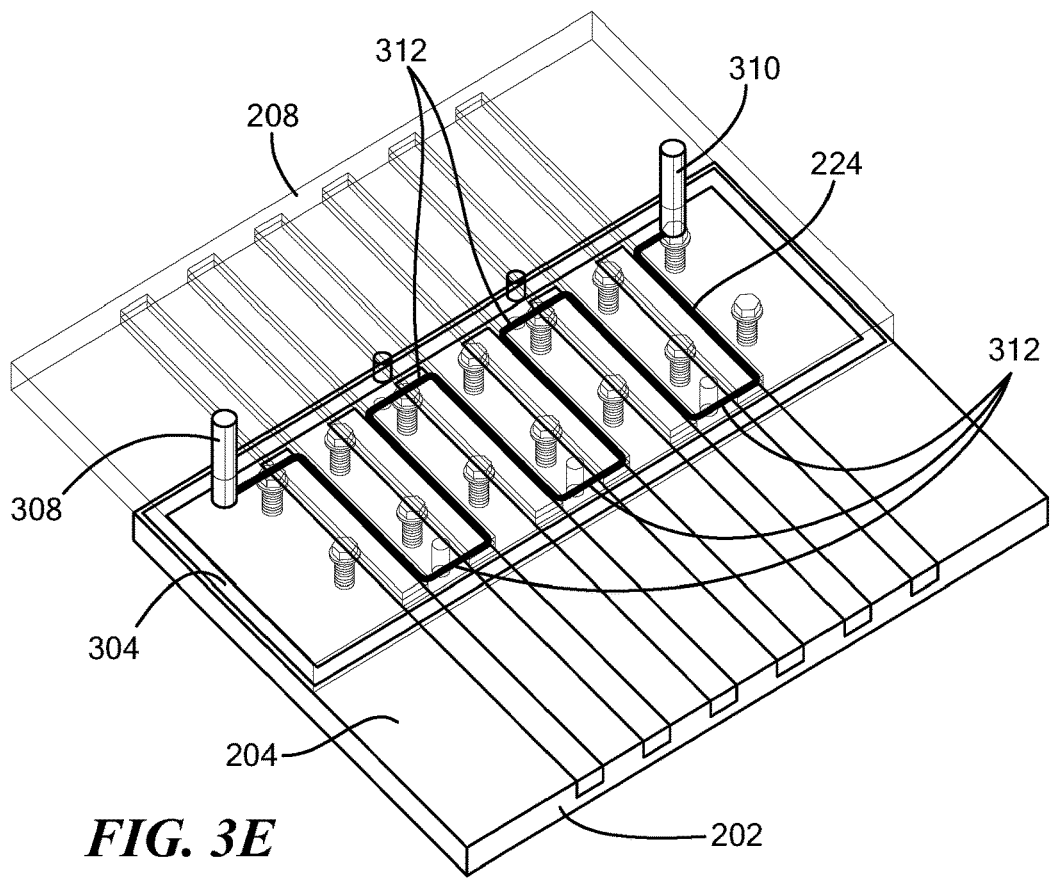
FIG. 3E is an isometric view of the top and bottom plates of FIG. 3B aligned and coupled together with the top plate being transparent to reveal underlying structures.

In FIG. 3E, the top plate 208 is made transparent so that solder channel 224 can be viewed. Solder 218 may be introduced into solder inlet 308 and made to flow through solder channel 224 until the entire solder channel 224 is filled with molten solder. As mentioned above, the solder 218 may follow a serpentine path through the solder channel 224 and may create electrical connections between the superconducting channels 207 of the top plate 204 and the paired (or parallel) superconducting channels 209 of the bottom plate 208. The solder and plates are then allowed to cool so that the solder solidifies within the solder path 224.

Figure 3F:
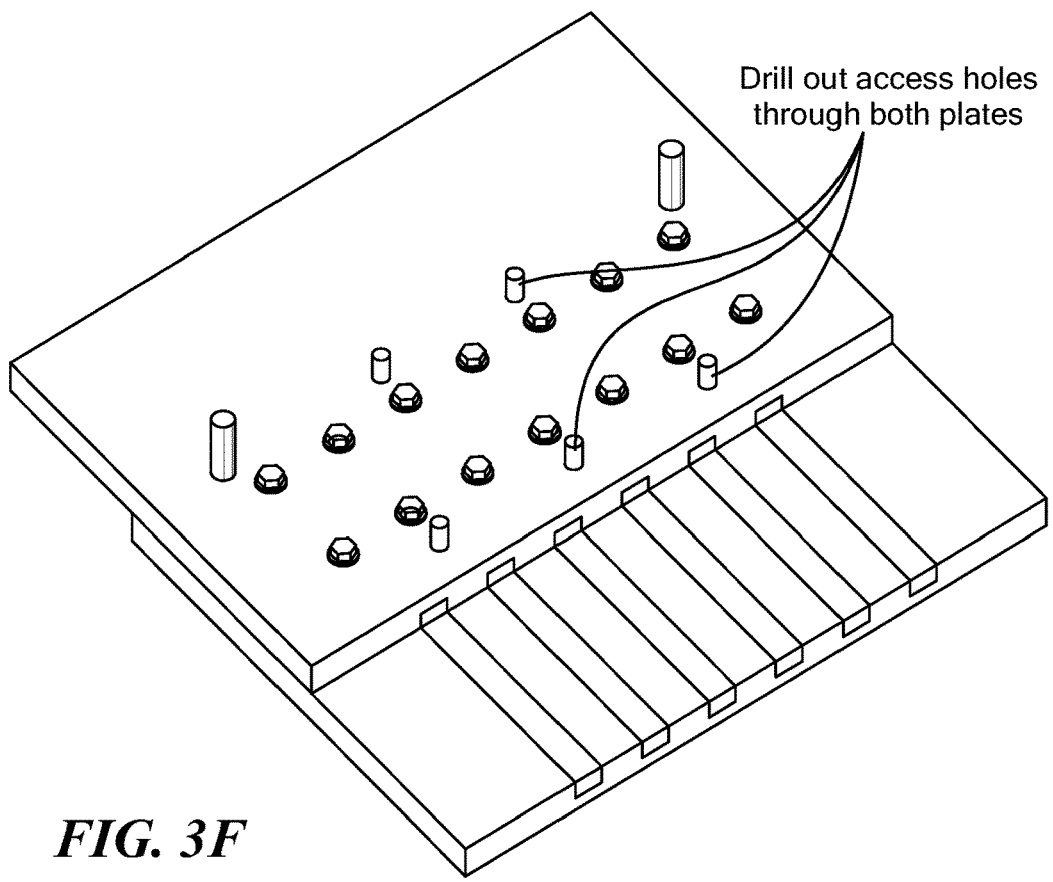
FIG. 3F is an isometric view of the top and bottom plates of FIG. 3B aligned and coupled with access holes in the top plate.

At this point during the process, because the solder path is a continuous path that touches all the superconducting channels, the solder creates electrical connections (or "solder bridges") 312 between the superconducting channels, essentially shorting the superconducting channels to each other. Thus, after cooling, sections of the solder path (e.g. sections 312) may be cut or otherwise broken or separated so that electrically connected superconducting channels are not shorted to each other. As shown in FIG. 3F, the solder bridges may be cut, for example, by inserting a drill into access holes 302 and drilling through sections 312 of the solder to thus break or separate solder bridges.

Figure 3G:
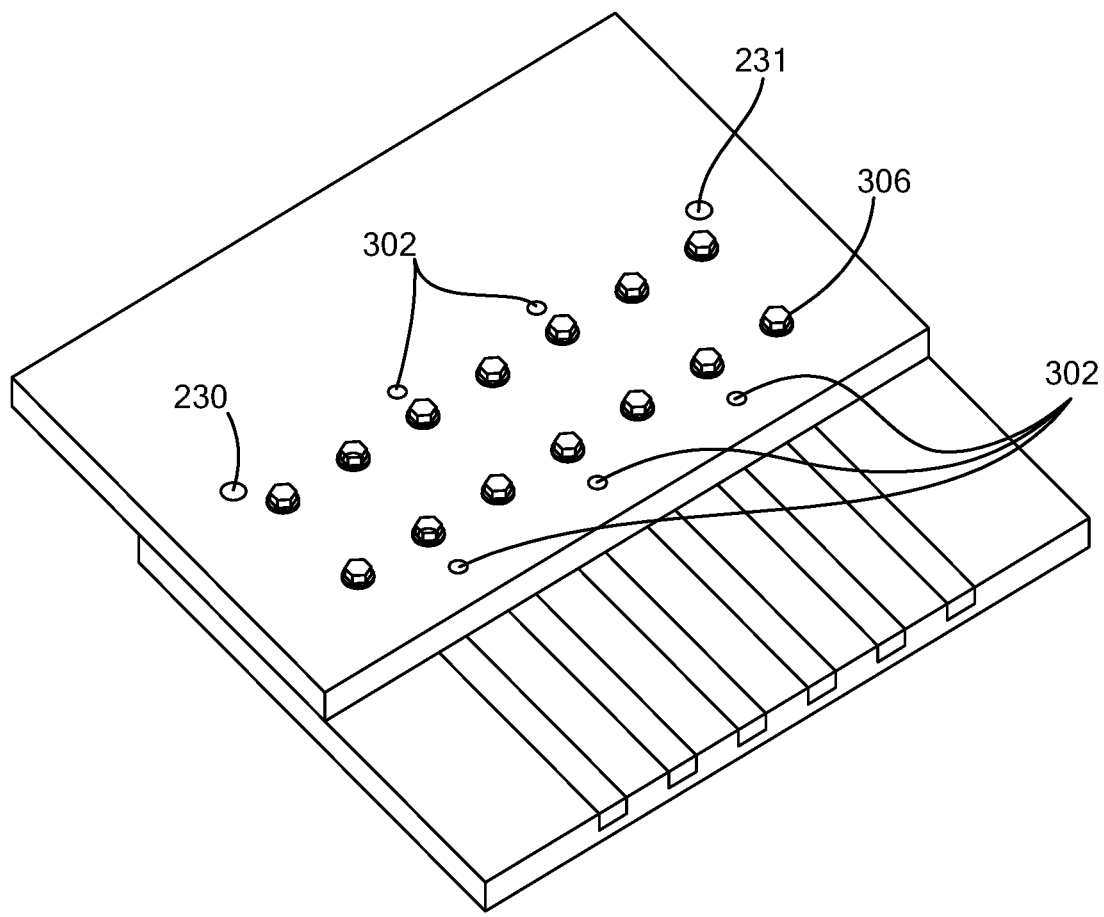
FIG. 3G is an isometric view of the top and bottom plates of FIG. 3B aligned and coupled with filled access holes in the top plate.

In FIG. 3G, inlet and outlet ports 308, 310 are removed and plugs (e.g. stud screws) may be inserted into access holes 302 to optionally seal them. Some or all of the bolts 306 may also be removed, and the remaining bolt holes (if any) may also be plugged and sealed (e.g., by inserting a stud screw into any open screw hole).

In some embodiments, the clamping function of the bolts may be performed via an external structure akin to a vise or clamp. In this case, bolts may not be needed or present in the immediate vicinity of the joint where the vise is disposed to hold the plates.

Figure 4A:
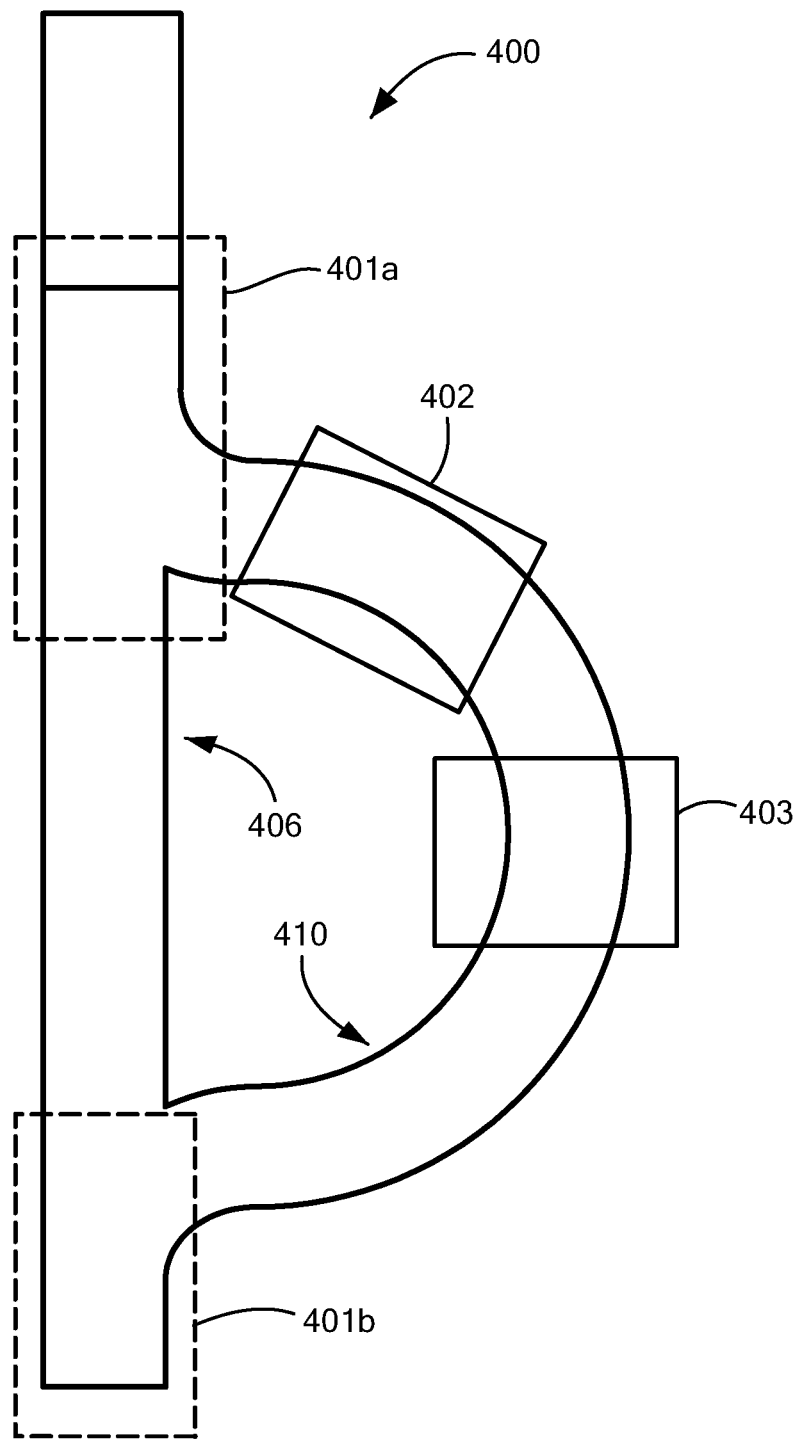
FIG. 4A is a top view of a demountable plate.

Referring now to FIGS. 4A-4C in which like elements are provide having like reference designations throughout the several views, FIGS. 4A-4C illustrate an embodiment of an NI-HTS magnet 400 having demountable solder joints at locations 401a and 401b (FIG. 4A). As will become apparent from the description of FIGS. 4B, 4C, by virtue of the demountable solder joints, the NI-HTS magnet 400 may be separated (or dismantled) into multiple pieces.

It should be appreciated that the demountable solder joins in locations 401a, 401b are arranged in a so-called "praying hands" configuration. In contrast to a lap joint configuration (as illustrated in FIGS. 2A-3G) which is typically used to couple plates end to end with superconducting current paths of the joined plates extending in opposite directions, in the praying hands joint configuration, the ends of the superconducting channels (e.g. end 404 of plate 406 and end 408 of plate 410) extend in the same direction, similar to the fingers of two hands that are placed together during prayer.

FIG. 4A illustrates an NI-HTS magnet 400 having a generally D-shape with a substantially straight section coupled to a curved section 410 via joints in the praying hands configuration in locations 401a and 401b. It should, of course, be appreciated that additionally or alternatively, magnet 400 may comprise differently shaped sections and different joint locations for dismantling. For example, magnet 400 may comprise joints in one or both of regions 402 and 403. Also, location 403 may be suitable for a lap joint because the curved shape at location 403 may lend itself to overlapping plates with ends in opposite directions, rather than a praying hands joint with ends oriented in the same direction. Thus, in embodiments, magnet 400 may comprise two different types of demountable solder joints (i.e. one or more joints in the "praying hands" configuration and one or more joints in the "lap joint" configuration). After reading the disclosure provided herein, one of ordinary skill in the art will appreciate how to select joint locations and joint configurations to meet the needs of a particular application.

In FIG. 4B, the magnet 402 shown is separated (or dismantled) into two plates 406 and 410 with plate 406 being straight and plate 410 having curved portions. It should be appreciated that plates 406, 410 in FIG. 4B are made transparent to illustrate structures in the plates which would otherwise not be visible. Plate 406 comprises two joint regions 412a, 414a and plate 410 comprises two joint regions 412b, 414b. Joints in the praying hands configuration may be formed by aligning the respective joint regions 412a, 412b and 414a, 414b as illustrated in FIG. 4C.

In FIG. 4C, the plates 406 and 410 are aligned and have overlapping portions at which joints have been formed at locations 412 and 414. Again, as in FIG. 4B, the plates are made transparent to illustrate structures which would otherwise not be visible. In various embodiments, the ends of the plates in a praying hands joint may be flush. For example, in joint area 414, the ends of plates 406, 410 form a flush end 418 when stacked together. In contrast, the ends of the plates 406 and 410 are not flush in joint area 412. Rather, end 404 of plate 406 extends beyond end 408 of plate 410.

If found necessary, a thin insulating material may be placed between plates 406 and 410 in regions where joints are not formed. According to some embodiments, insulating material 250 may comprise polyimide (e.g., Kapton®), epoxy resin, phenolic resin, glass epoxy laminate, a plastic, an elastomer, or combinations thereof. According to some embodiments, insulating material may have a breakdown voltage or dielectric strength of greater than 25 kV/mm, of greater than 50 kV/mm, of greater than 75 kV/mm, of greater than 100 kV/mm. In some cases, the voltages in the superconducting magnet may be comparatively low, in which case a low voltage standoff insulating material such as anodized aluminum could be utilized as the insulating material Plate 406 comprises a plurality of, here seven, HTS channels 420a-420g while plate 410 comprises a plurality of, here six, HTS channels 422a-422f It should be noted that HTS channel 420a extends from a first end 404 of plate 406 into joint region 414a of plate 406 and HTS channel 420g extends from first end 404 of plate 406 into joint region 412a of plate 406. The ends 421a, 421b of respective HTS channels 420a, 420g may be coupled to a power supply (not illustrated in FIG. 4C).

When the joint regions of plates 406, 410 are aligned (as illustrated in FIG. 4C) a first end of HTS channel 422a aligns with (or overlaps) a portion of HTS channel 420a in joint region 414 and a second end of HTS channel 422a aligns with (or overlaps) HTS channel 420b in joint regions 412. That is, the HTS channels shift. Similarly, a first end of HTS channel 422b aligns with (or overlaps) a portion of HTS channel 420b in joint region 414 and a second end of HTS channel 422a aligns with (or overlaps) HTS channel 420c in joint regions 412 and so on and so forth until all HTS channels in plate 410 align with an HTS channel in plate 406. By shifting the alignment HTS channels, a loop (or continuous current path) can be formed between the ends 421a, 421b of HTS channels 420a, 420g.

Figure 5:
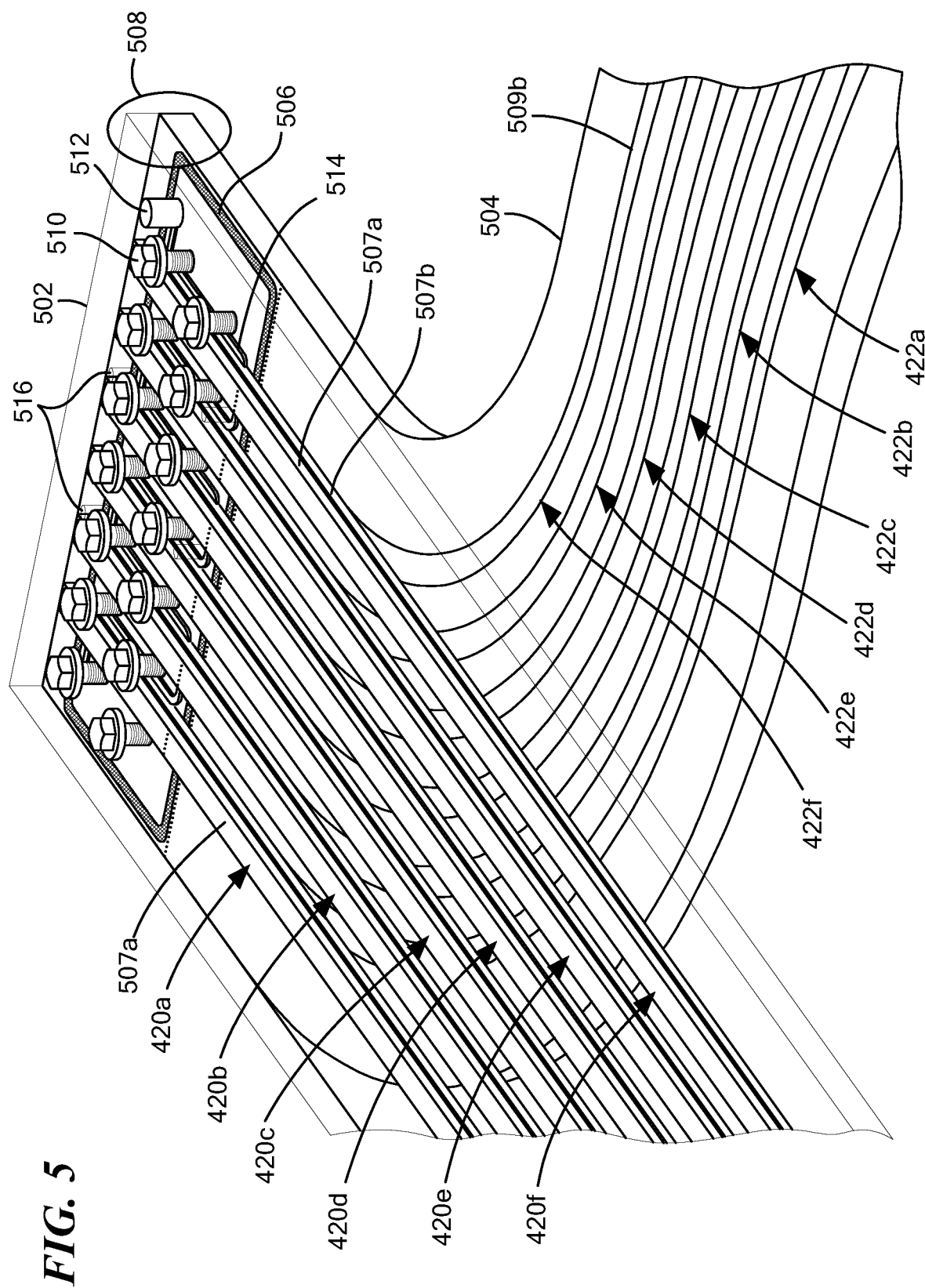
FIG. 5 is an enlarged perspective view of a joint region of FIG. 4C.
Figure 6:
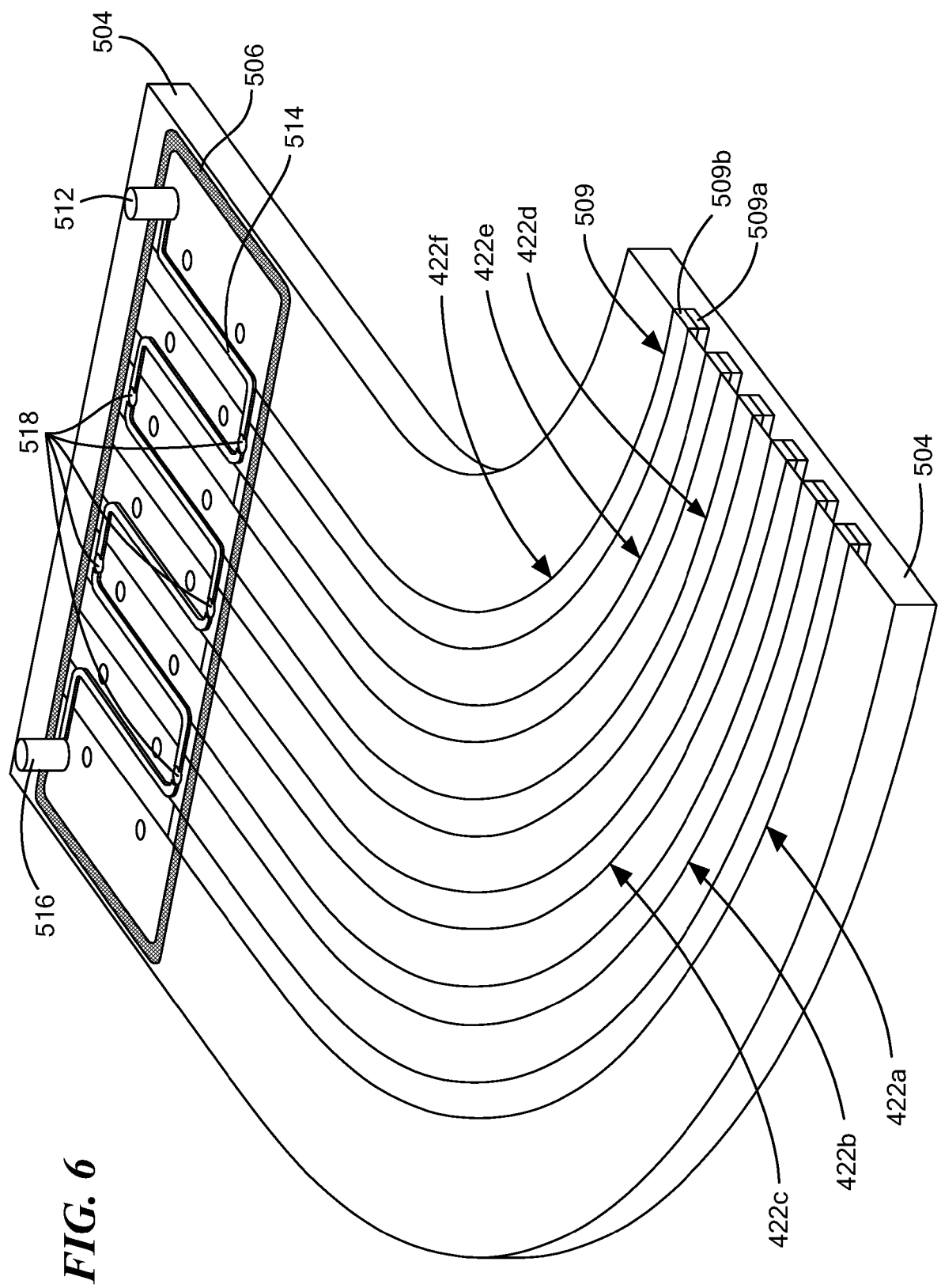
FIG. 6 is a perspective view of the joint region of the bottom plate of FIG. 5.

Referring to FIGS. 5 and 6 in which like elements of FIGS. 4A-4C are provided having like reference designations, a praying hands joint may be formed using a process which is the same as or similar to the process for forming a lap joint described above. A gasket 506 is disposed between plates 502 and 504 to create a vacuum-tight seal in a joint region. Top plate 502 (shown as transparent in FIG. 5) is aligned with bottom plate 504 so that at least some of the superconducting current paths 420a-420f within plate 502 are aligned with the superconducting current paths 422a-422f of plate 504.

As illustrated in FIG. 5, superconducting current paths comprises a superconducting material (e.g. an HTS) 507a having a conductor (e.g. a copper channel cap) 507b disposed thereover. Although not explicitly illustrated in FIG. 5, superconductor 507a and conductor 507b may be secured in in the channel of the plate (and also secured together) via solder.

In this example, the ends 508 of plates 502 and 504 are flush and all superconducting current paths within plate 502 are aligned with the superconducting current paths of plate 504. Bolts 510 fasten plates 502, 504 together with a force sufficient to allow a vacuum to be formed within the joint region. As described above in conjunction with FIGS. 2A-2C, the regions around the threads of the bolts may also be sealed to make a fluid-tight seal around the bolts.

At least the joint regions of the plates are heated (e.g. to a temperature above the melting point of the low-temperature solder) and a molten solder may be introduced into inlet port 512. Simultaneously, a vacuum may be applied to an outlet port (not shown) to draw molten solder from inlet 512 through solder channel 514 to the outlet port. Once the solder permeates solder channel 514 (e.g. seeps and wets between and around the superconducting current paths 420, 422), the plates are cooled, and the solder is allowed to solidify. The solder is then cut, separated or otherwise broken at access points 518 to eliminate conductive current paths (i.e. solder shorts). The bolts 510 may then be removed, and the bolt holes, access ports, and solder inlet and output ports may be plugged and sealed. As noted above, solder channel 514, may be provided in either the top plate, the bottom plate or in both plates. Also, the solder channel may be formed either before or after the HTS channels are formed and may also be formed either before or after HTS is disposed in the HTS channels.

Referring to FIG. 6, bottom plate 504 is shown without top plate 502. Superconducting channels 422a-422f comprises a superconducting material (e.g. an HTS) 509a having a conductor (e.g. a copper channel cap) 509b disposed thereover. Although not explicitly illustrated in FIG. 5, superconductor 509a and conductor 509b may be secured in in the channel of the plate 504 (and also secured together) via solder.

As shown, the solder channel 514 may make a serpentine path along and through the superconducting channels 422a-422f However, in other embodiments, the solder may follow a straight path or angled path. Any path that allows superconducting channels of the top and bottom plates to be soldered or electrically coupled together may be appropriately used. It should also be appreciated that although solder flow path is illustrated as a single continuous channel in FIG. 6, in other embodiments, multiple individual solder flow channels disposed adjacent superconducting current paths in the joint region (e.g. the region defined by the perimeter of the gasket 506) may be used.

In some embodiments, solid solder material may be placed into some or all solder channels prior to joining the plates together. This eliminates the need to connect the channels together and deliver the required amount of solder in liquid form (i.e. with the approach, multiple, separate solder channels may be used rather than a single continuous channel (e.g. as illustrated at least in FIGS. 2C, 3E and 6).

With the top plate removed, the breaks 518 that are drilled through the solder channel 514 are visible. These breaks eliminate short circuit current paths between the superconducting channels that may be created during the soldering process (such as a VPI soldering process).

Figure 7:
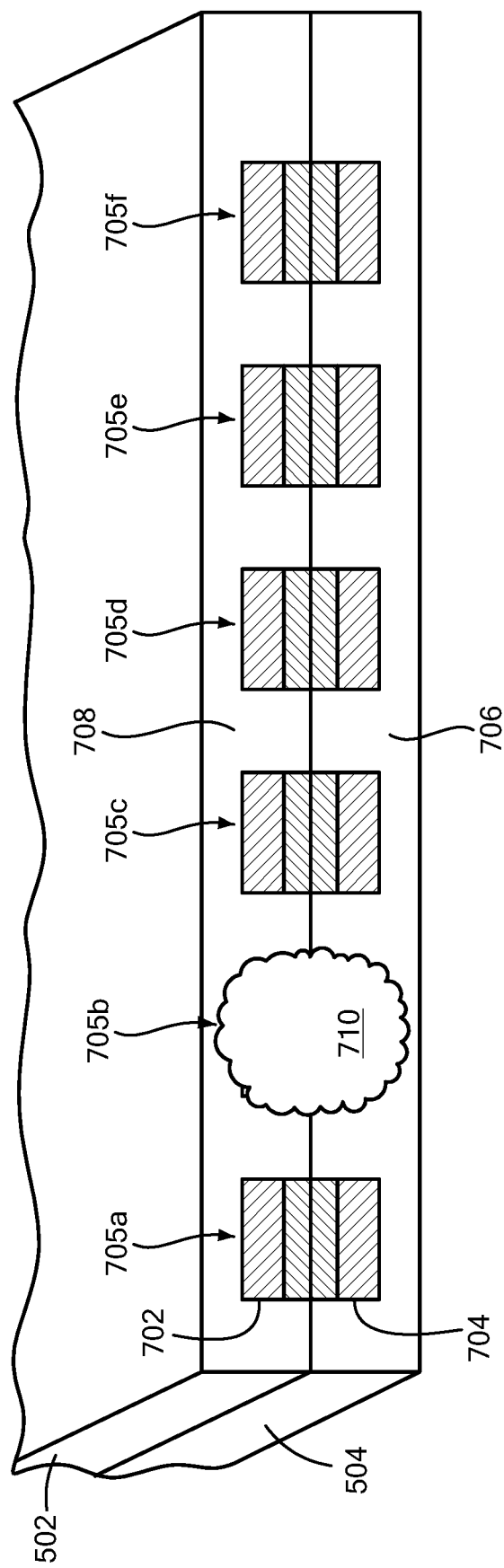
FIG. 7 is a cross-sectional view of a demountable joint region in a praying hands configuration.

Referring to FIG. 7, a plate assembly comprised of plates 502 and 504 may include superconducting channels (e.g. aligned channels 702 and 704) that extend to the terminal ends 706 and 708 of plates 502 and 504. Thus, aligned channels 702 and 704 may be said to form a superconducting channel pair 705a. In this example embodiment, the plate assembly includes six such superconducting channel pairs 705a-705f.

In this case (i.e. in the case where superconducting channels extend to the terminal ends of plates), solder can be applied via the ends of the superconducting channels. This technique for introducing solder between superconducting channels of opposing plates 502, 504 may be used in place of, or in addition to, solder applied through a solder channel such as solder channel 514 (FIGS. 5, 6). Solder joints, such as solder joint 710 disposed over superconducting channel pair 705b, covering the ends of the superconducting channels may provide electrical connection between the paired channels and may also act as a mechanical fastener to hold the plates together. Only one such solder joint 710 is shown in FIG. 7 for simplicity and clarity. In practice, some or all of the superconducting channel pairs 705a-705f may be coupled together at their terminal ends with solder joints similar to joint 710.

To create a joint such as joint 710, a manifold may be placed over the ends 706 and 708 of respective plates 502, 504 thereby covering some or all of the superconducting channel pairs 705a-705f The manifold may then be filled with molten solder and the manifold directs the molten solder to the respective channel pairs 705a-705f. When the solder solidifies, the manifold can be removed. Any remaining solder that creates unwanted low impedance current paths (e.g. short circuit current paths) between ones of the superconducting channel pairs 705a-705f can be removed. In embodiments, if the ends of the superconducting channels are soldered, the solder channel that runs through the plates and the solder inlet and outlet ports may not be needed and may be omitted.

Figure 8:
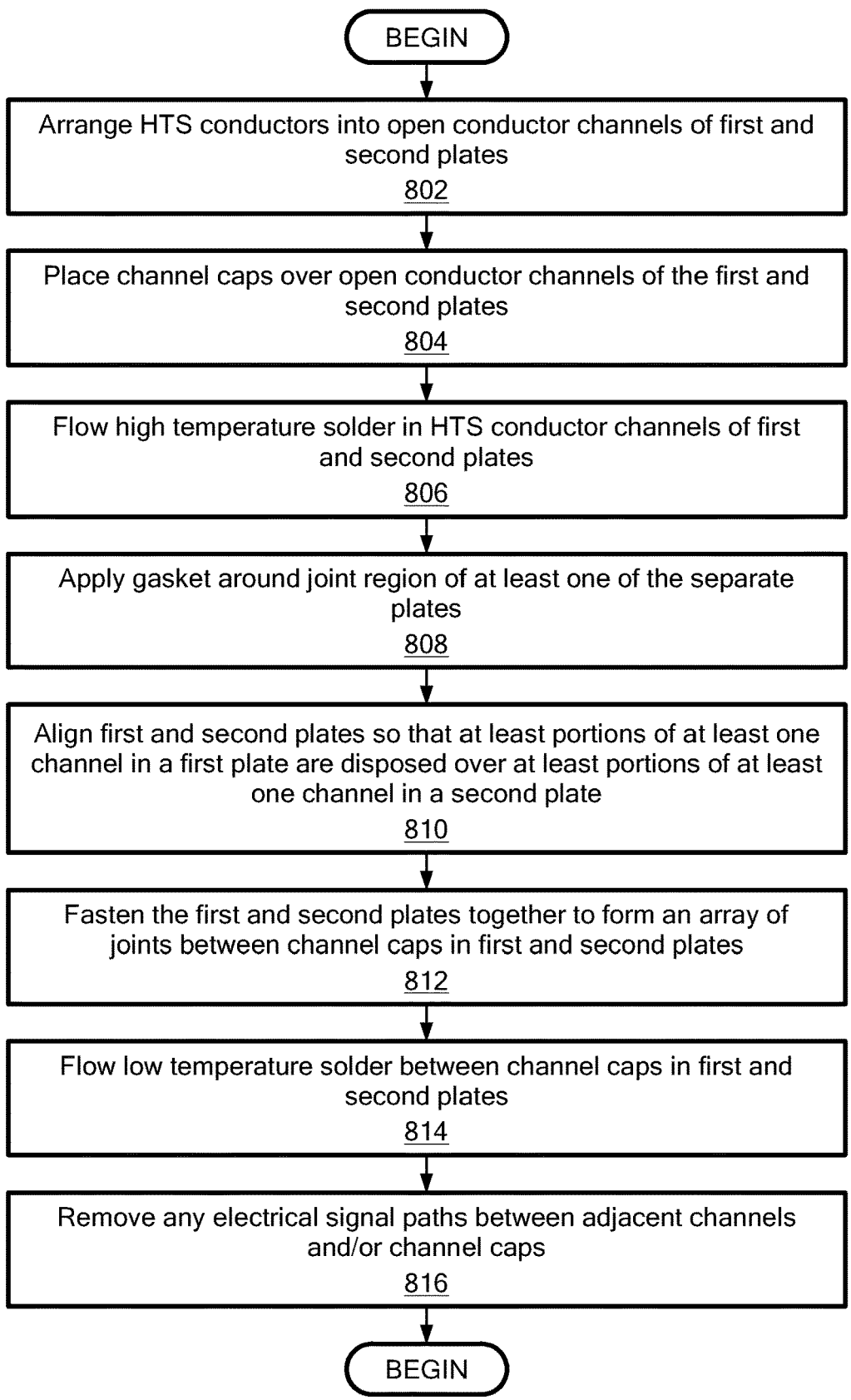
FIG. 8 is a flow diagram of a process for joining plates having high temperature superconductor (HTS) current paths provided as part thereof.
Figure 9:
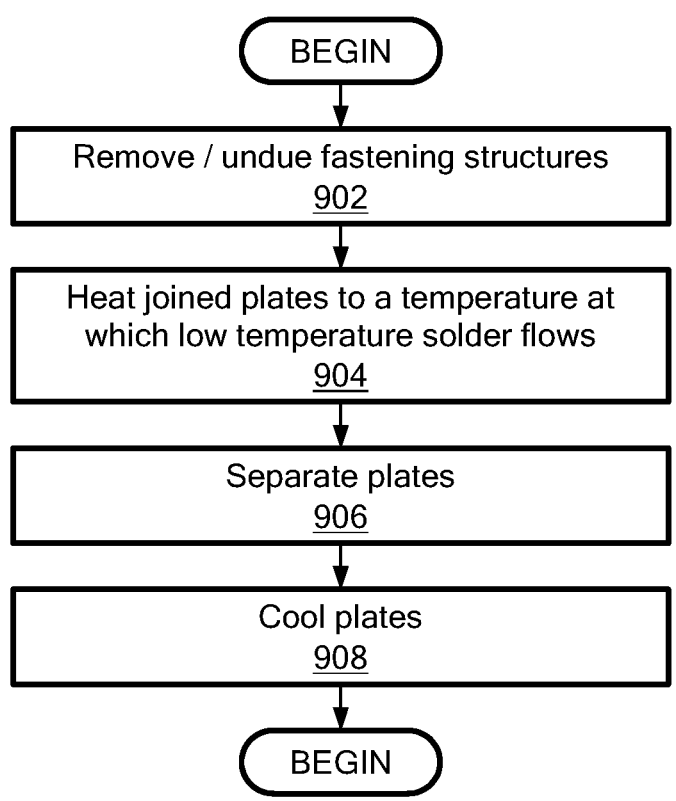
FIG. 9 is a flow diagram of a process for separating plates having high temperature superconductor (HTS) current paths provided as part thereof.

FIGS. 8 and 9 are flow diagrams comprising a sequence of processing actions which form an illustrative embodiment of a process for constructing, joining and separating superconducting current paths coupled with solder joints in accordance with the concepts described herein. It should be appreciated that, unless explicitly stated, the processing actions in the flow diagram are unordered meaning that the processing actions listed in the flow diagram may be performed in any convenient order.

FIG. 8 is a flow diagram of a process for constructing and joining plates of an NI-HTS magnet. In 802, superconducting HTS conductors (e.g. conductors 212 and 220 in FIG. 2B) are positioned within conductor channels of conductive plates. In 804, conductors such as conductive channel caps (e.g. caps 216 and 222 in FIG. 2B) are disposed over the HTS conductors. In 806, solder of a first type may be applied to the HTS conductors and/or the channel caps. In 808, a gasket (e.g. gasket 304) may be disposed on one or both plates around the joint region of at least one of the plates. In 810, the plates are aligned so that portions of the HTS conductor channels of one plate are disposed over the portions of HTS conductor channels of the other plate. In 812, the plates are secured together (e.g. fastened, bolted, clamped, pressed, etc.) to form an array of joints between the HTS conductor channels of the plates. In 814, solder of a second type, in molten form, is introduced into and flows through one or more solder channels that runs through the joint area to deliver molten solder to the HTS conductor channels. The second type of solder has a liquidus which is lower than the liquidus of the first solder type. In 816, if necessary, electrical current paths (e.g. shorts) between adjacent HTS conductors channels are removed so as to eliminate unwanted shorts between HTS conductor channels.

FIG. 9 is a flow diagram of a process for separating (or dismantling) superconducting current paths which have been joined via a solder joint. In embodiments, the superconducting may be provided as HTS conductors embedded in channels of two or more plates. Such plates may be used to provide an HTS magnet.

In 902, any mechanical fasteners (bolts, clamps, etc.) between plates (e.g. plates 204, 208; 406, 410; 502, 504) are removed. In 904, at least the joint regions of the plates are heated to a temperature above the melting point of solder joining the HTS conductors in opposing plates (so-called joint solder or low temperature solder) but below the melting point of any solder in the HTS channels (if any). One the joint solder turns pasty (i.e. softens) or liquidus, in 906, the plates are physically separated. In 908, the plates are actively or passively cooled to the ambient temperature for transportation and/or storage and/or re-use.

Figure 10A:
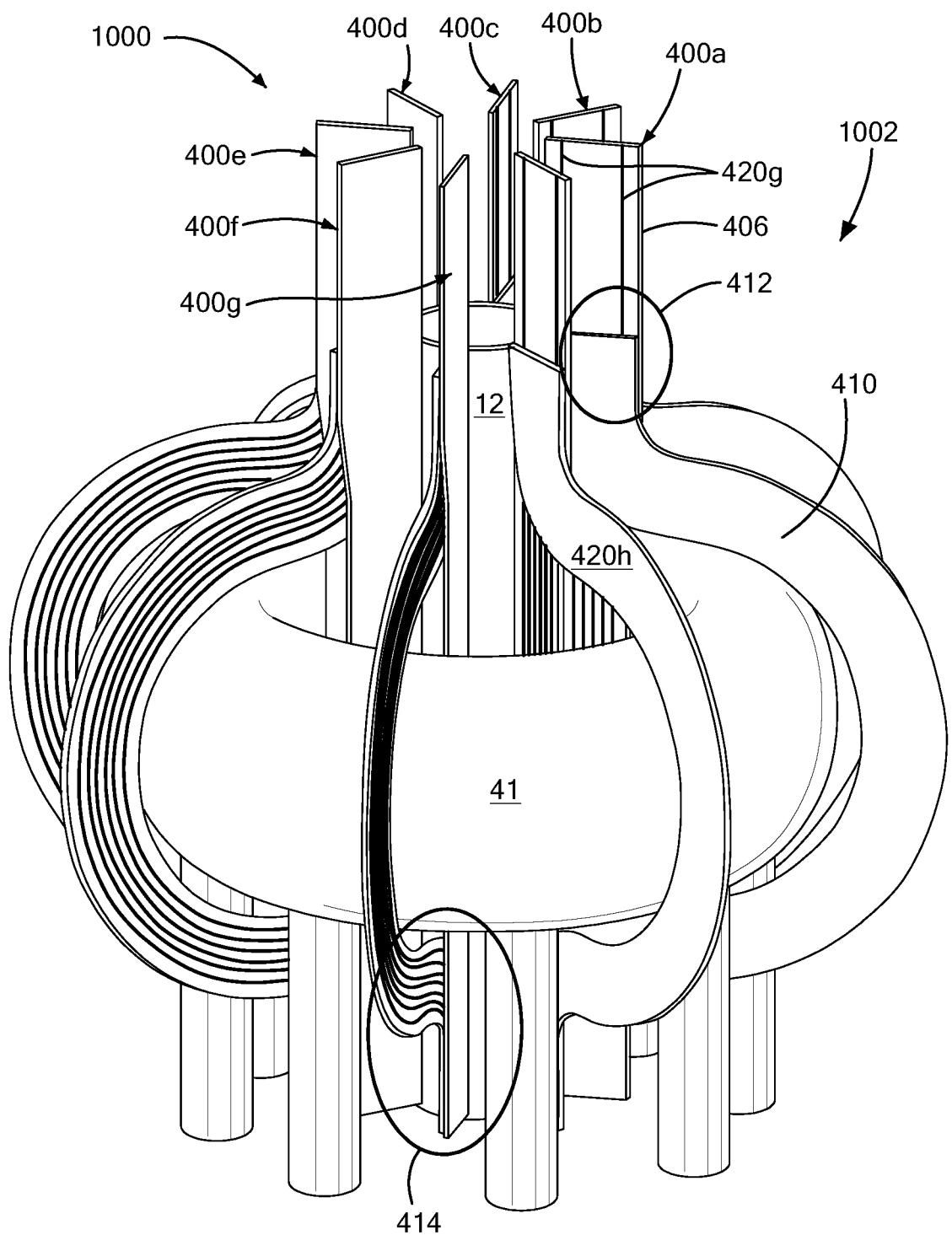
FIGS. 10A-10D are a series of isometric views illustrating removal of a toroidal field (TF) magnet having demountable joints from a tokamak power plant.

Referring to FIGS. 10A-10D in which like elements are provided having like reference designations, a fusion reactor 1000 is shown with a toroidal field (TF) HTS magnet 1002 comprising a plurality of, here eight (8) HTS magnets 400a-g which may be the same as or similar to HTS magnet 400 in FIG. 4C, with each HTS magnet having a straight plate portion (e.g. plate 406) coupled to a curved plate portion (e.g. plate 410) joined via praying hands joints (e.g. at joint regions such as region 412 and 414). In FIG. 10A, the HTS magnets 400a-g are assembled and installed in the reactor 1000 to form TF magnet 1002.

Figure 10B:
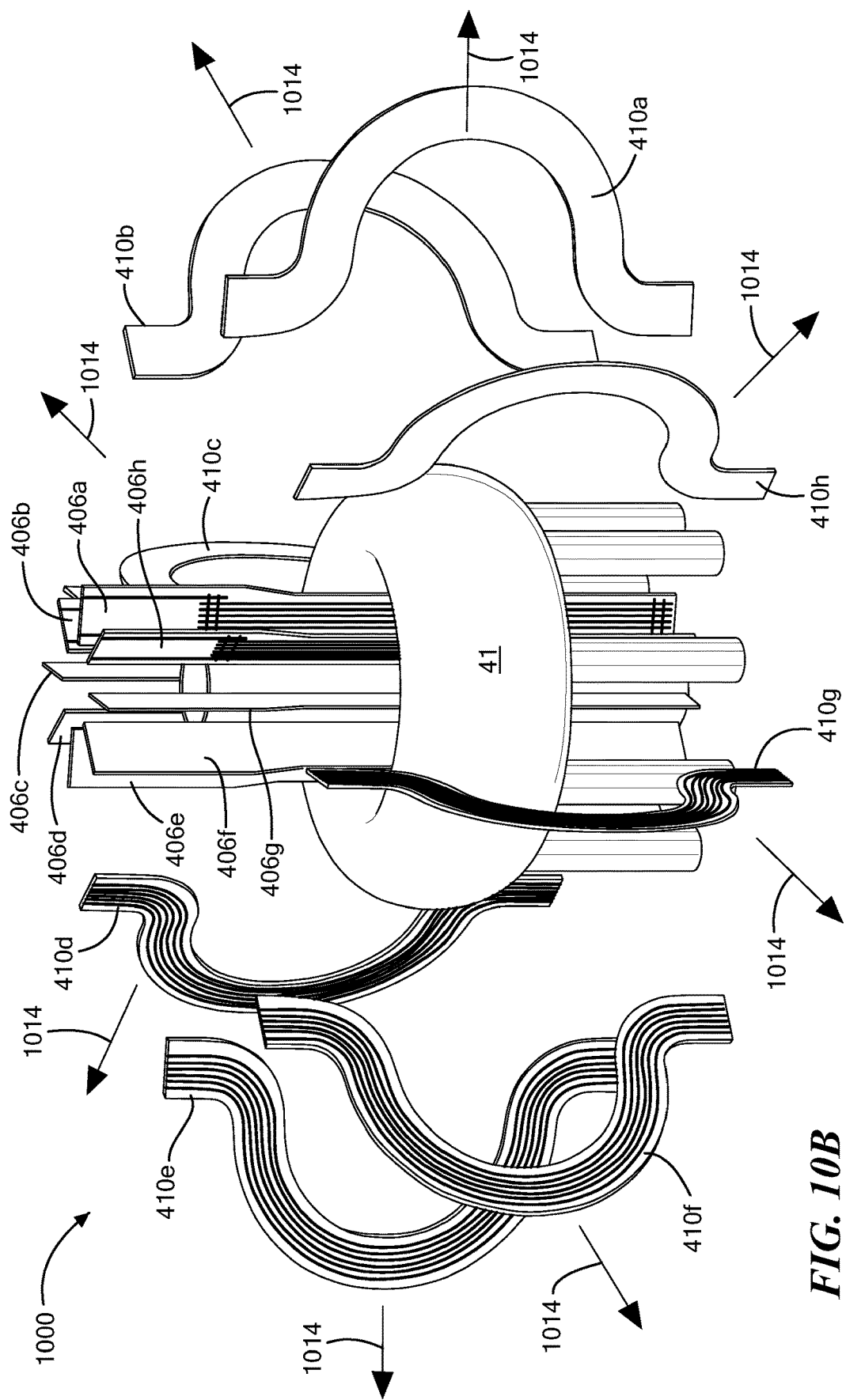

In FIG. 10B, the HTS magnets 400a-g (or dismantled) into their two component plates: the straight plate 406a-406h and the curved plate 410a-410h. In this embodiment, the dismantled magnet can be removed from the reactor 1000 by separating the joint regions of each, separating the TF magnets 400a-g at the praying hands joint locations into respective straight sections (e.g. straight plate 406a-406h) and curved sections (e.g. curved plates 410a-410h) by using the techniques described herein above. In particular, as shown in FIG. 10B, the curved sections can be removed from the reactor by, for example, pulling them away from radiation shield 41 (having vacuum vessel inside) to the side (e.g. in a radial direction) as indicated by arrows 1014. This facilitates the dismantling process by allowing the HTS magnets to be removed from the reactor while heavier reactor parts, such as radiation shield 41 and the vacuum vessel, remain in place.

Figure 10C:
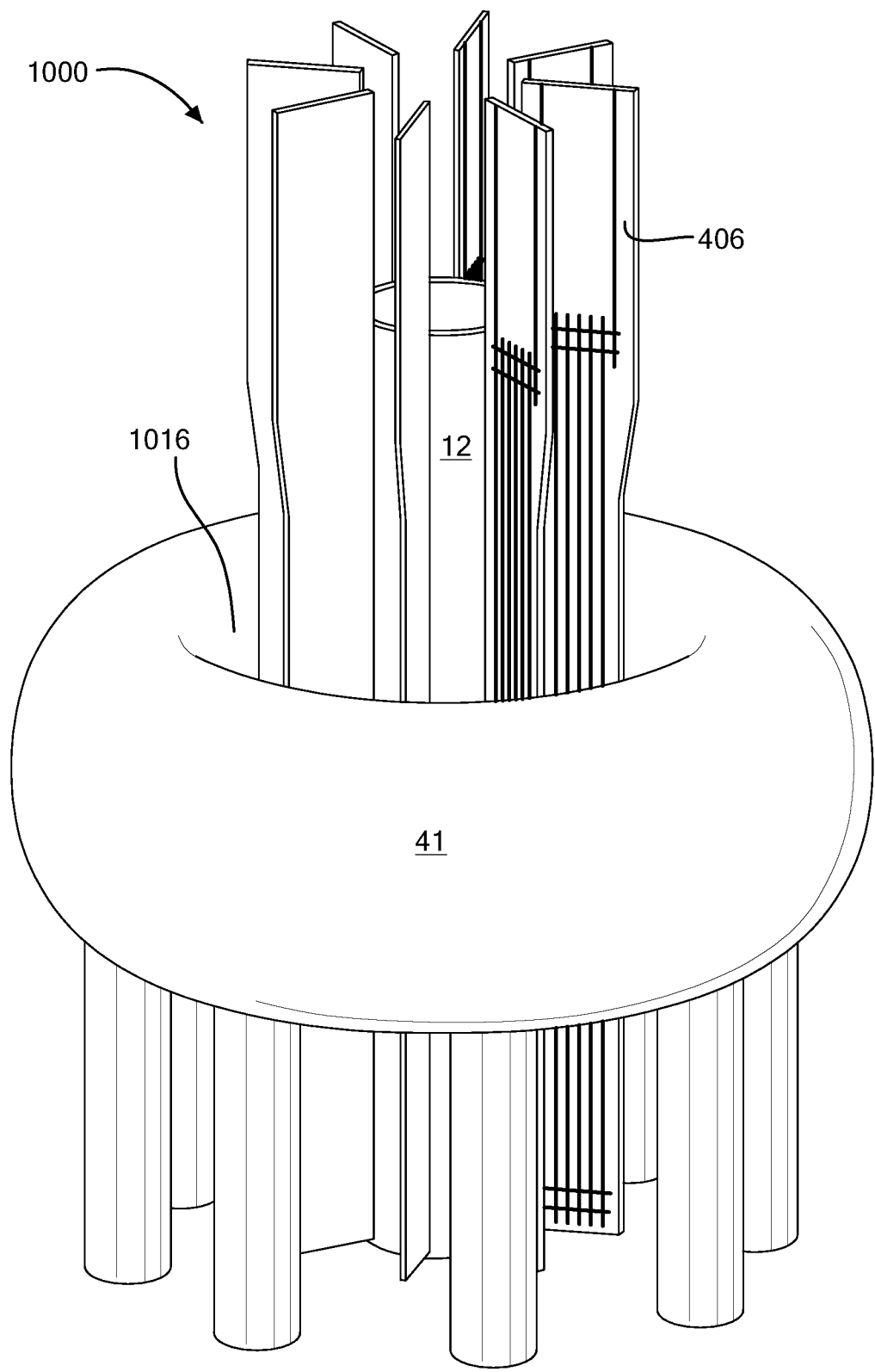

Referring to FIG. 10C, once the curved sections 410a-410h are removed, the straight plates (e.g. plates 406a-406h) remain in place around the central solenoid 12 and within the central hole 1016 in toroidal shaped vacuum vessel and radiation shield 41.

Figure 10D:
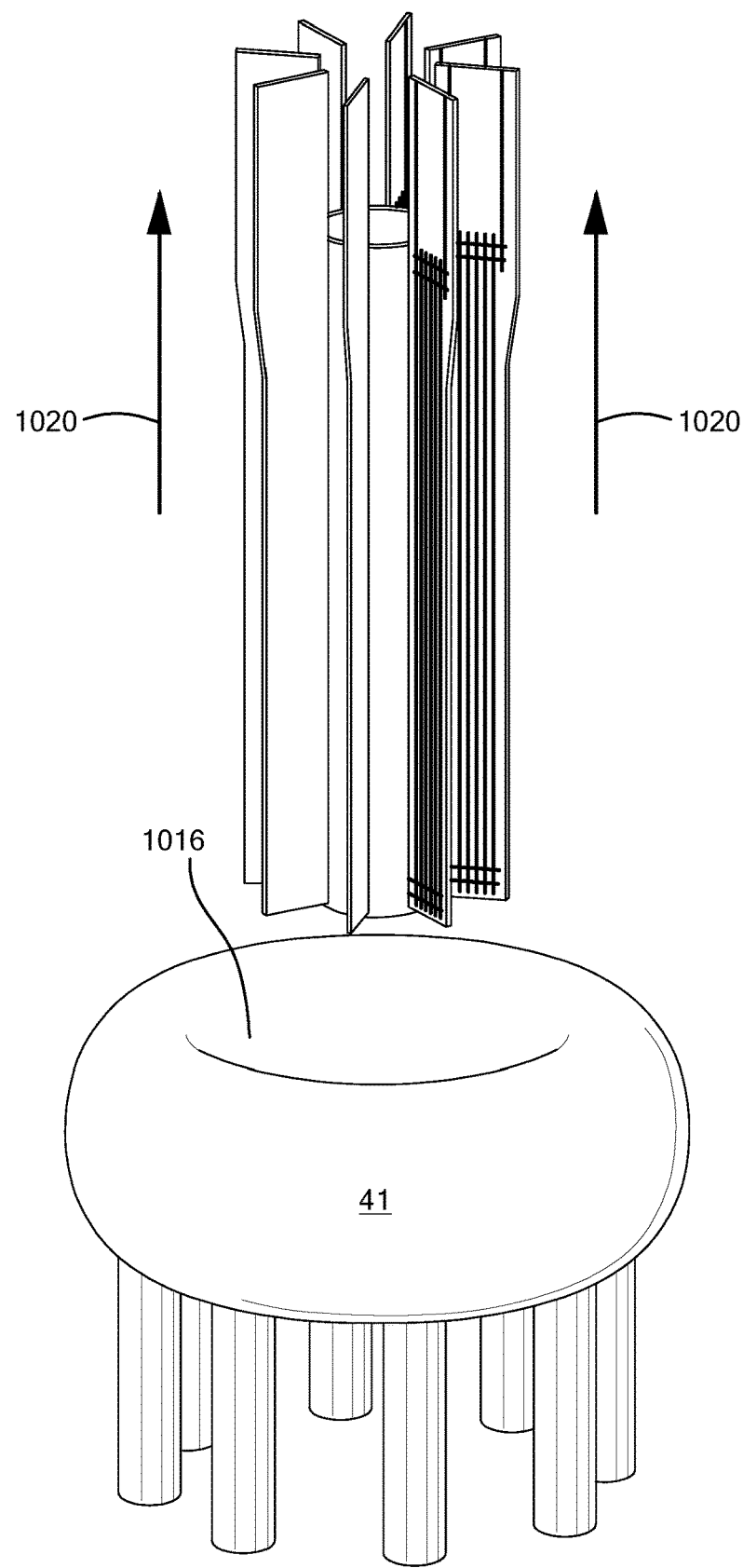

As shown in FIG. 10D, the straight plates and the solenoid 12 can then be removed from the radiation shield 41 and vacuum vessel by lifting them up and out from the center hole 1016 of the radiation shield 41, (in a direction indicated by arrows 1020 in FIG. 10D) leaving the radiation shield 41 and vacuum vessel in place. This allows the reactor 1000 to be disassembled without the need to move the radiation shield 41 and vacuum vessel, which may be heavy and difficult to lift or move during disassembly.

FIGS. 11A, 11B illustrate a demountable joint comprising a joint plate 1100. It should be appreciated that in the example embodiments described herein above, there is a conductor (e.g. a copper cap) on only one surface of the HTS (e.g., as illustrated by conductor 212 and HTS 216 in FIG. 2B). In some embodiments, it may be desirable or even necessary, to have conductors on opposing surfaces of the HTS. This is because sometimes it may be desirable or even necessary for the joint in a particular plate to be on a surface of the plate opposite the plate surface where the copper cap (or other conductor) exists. For instance, in the example of FIG. 11A, 11B it may be desirable or necessary to form a joint on a surface of a plate 204 opposite conductive cap 212. Thus, in this example, joint plate 1100 is disposed over a surface of HTS a solder joint is to be formed. It should be noted that joint plate 1100 is disposed over a short section of the HTS where a solder joint is to be formed.

Various embodiments of the concepts, systems, devices, structures, and techniques sought to be protected are described above with reference to the related drawings. Alternative embodiments can be devised without departing from the scope of the concepts, systems, devices, structures, and techniques described. It is noted that various connections and positional relationships (e.g., over, below, adjacent, etc.) may be used to describe elements in the description and drawing. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

As an example of an indirect positional relationship, positioning element "A" over element "B" can include situations in which one or more intermediate elements (e.g., element "C") is between elements "A" and elements "B" as long as the relevant characteristics and functionalities of elements "A" and "B" are not substantially changed by the intermediate element(s).

Also, the following definitions and abbreviations are to be used for the interpretation of the claims and the specification. The terms "comprise," "comprises," "comprising, "include," "includes," "including," "has," "having," "contains" or "containing," or any other variation are intended to cover a non-exclusive inclusion. For example, an apparatus, a method, a composition, a mixture or an article, that comprises a list of elements is not necessarily limited to only those elements but can include other elements not expressly listed or inherent to such apparatus, method, composition, mixture, or article.

Additionally, the term "exemplary" is means "serving as an example, instance, or illustration. Any embodiment or design described as "exemplary" is not necessarily to be construed as preferred or advantageous over other embodiments or designs. The terms "one or more" and "at least one" indicate any integer number greater than or equal to one, i.e. one, two, three, four, etc. The term "plurality" indicates any integer number greater than one. The term "connection" can include an indirect "connection" and a direct "connection".

References in the specification to "embodiments," "one embodiment," "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether or not explicitly described.

Relative or positional terms including, but not limited to, the terms "upper," "lower," "right," "left," "vertical," "horizontal, "top," "bottom," and derivatives of those terms relate to the described structures and methods as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another, or a temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

The disclosed subject matter is not limited in its application to the details of construction and to the arrangements of the components set forth in the following description or illustrated in the drawings. The disclosed subject matter is capable of other embodiments and of being practiced and carried out in various ways.

Also, the phraseology and terminology used in this patent are for the purpose of description and should not be regarded as limiting. As such, the conception upon which this disclosure is based may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, the present disclosure has been made only by way of example. Thus, numerous changes in the details of implementation of the disclosed subject matter may be made without departing from the spirit and scope of the disclosed subject matter.

Accordingly, the scope of this patent should not be limited to the described implementations but rather should be limited only by the spirit and scope of the following claims.

All publications and references cited in this patent are expressly incorporated by reference in their entirety.

The invention claimed is:

1. An apparatus comprising:
a first plate comprising a plurality of channels that include a first layer of a high temperature superconductor (HTS) and a first electrically conductive layer over the first layer of the HTS, wherein the first plate comprises at least one solder flow pathway extending from an exterior of the first plate to at least one of the plurality of channels of the first plate;
a second plate comprising a plurality of channels that include a second layer of the HTS and a second electrically conductive layer over the second layer of the HTS; and
a layer of solder contacting a portion of the first electrically conductive layer of the first plate and a portion of the second electrically conductive layer of the second plate,
wherein the second plate is disposed over the first plate such that the portion of the first electrically conductive layer is arranged next to the portion of the second electrically conductive layer with the layer of solder between the portion of the first electrically conductive layer and the portion of the second electrically conductive layer, thereby providing an electrically conductive path from the first electrically conductive layer to the second electrically conductive layer.

2. The apparatus of claim 1, wherein the at least one solder flow pathway has a path shape that allows solder to flow between the first layer of the HTS in channels of the first plate and the second layer of the HTS in overlapping channels of the second plate.

3. The apparatus of claim 1, further comprising a gasket disposed between the first plate and the second plate.

4. An apparatus comprising:
a first plate comprising a plurality of channels that include a first layer of a high temperature superconductor (HTS) and a first electrically conductive layer over the first layer of the HTS;
a second plate comprising a plurality of channels that include a second layer of the HTS and a second electrically conductive layer over the second layer of the HTS; and
a layer of solder contacting a portion of the first electrically conductive layer of the first plate and a portion of the second electrically conductive layer of the second plate,
wherein the second plate is disposed over the first plate such that the portion of the first electrically conductive layer is arranged next to the portion of the second electrically conductive layer with the layer of solder between the portion of the first electrically conductive layer and the portion of the second electrically conductive layer, thereby providing an electrically conductive path from the first electrically conductive layer to the second electrically conductive layer, wherein the first electrically conductive layer is arranged in contact with the first layer of the HTS.

5. The apparatus of claim 4, further comprising a gasket disposed between the first plate and the second plate.

6. An apparatus comprising:
a first plate comprising a plurality of channels that include a first layer of a high temperature superconductor (HTS) and a first electrically conductive layer over the first layer of the HTS, wherein the first plate comprises a stack of layers of the HTS, the stack of layers including the first layer of the HTS;
a second plate comprising a plurality of channels that include a second layer of the HTS and a second electrically conductive layer over the second layer of the HTS; and
a layer of solder contacting a portion of the first electrically conductive layer of the first plate and a portion of the second electrically conductive layer of the second plate,
wherein the second plate is disposed over the first plate such that the portion of the first electrically conductive layer is arranged next to the portion of the second electrically conductive layer with the layer of solder between the portion of the first electrically conductive layer and the portion of the second electrically conductive layer, thereby providing an electrically conductive path from the first electrically conductive layer to the second electrically conductive layer.

7. The apparatus of claim 6, further comprising a gasket disposed between the first plate and the second plate.

8. An apparatus comprising:
a first plate comprising a plurality of channels that include a first layer of a high temperature superconductor (HTS) and a first electrically conductive layer over the first layer of the HTS;
a second plate comprising a plurality of channels that include a second layer of the HTS and a second electrically conductive layer over the second layer of the HTS; and
a layer of solder contacting a portion of the first electrically conductive layer of the first plate and a portion of the second electrically conductive layer of the second plate,
wherein the second plate is disposed over the first plate such that the portion of the first electrically conductive layer is arranged next to the portion of the second electrically conductive layer with the layer of solder between the portion of the first electrically conductive layer and the portion of the second electrically conductive layer, thereby providing an electrically conductive path from the first electrically conductive layer to the second electrically conductive layer, wherein the plurality of channels of the first plate are arranged next to the plurality of channels of the second plate, with respective portions of the first electrically conductive layer in the plurality of channels of the first plate arranged next to portions of the second electrically conductive layer in the plurality of channels of the second plate.

9. The apparatus of claim 8, wherein the layer of solder extends over each of the portions of the first electrically conductive layer in the plurality of channels of the first plate.

10. The apparatus of claim 8, further comprising a gasket disposed between the first plate and the second plate.

11. An apparatus comprising:
a first plate having one or more channels provided in a surface thereof and having a joint region, the joint region having at least one opening through which solder may be introduced;
a first high temperature superconductor (HTS) disposed in the one or more channels of the first plate;
a conductor disposed over the HTS in the one or more channels of the first plate; a second plate, having one or more channels provided in a surface thereof and having a joint region;
a second HTS disposed in the one or more channels of the second plate; and
a conductor disposed over the HTS in the one or more channels of the second plate;
wherein the second plate is disposed over the first plate such that the joint region in the first plate is disposed over the joint region in the second plate and at least a portion of the conductor disposed over the HTS in the one or more channels of the first plate contacts at least a portion of the conductor disposed over the HTS in the one or more channels of the first plate.

12. An apparatus according to claim 11 wherein the joint region comprises at least one solder flow pathway and at least one opening through which solder may be introduced into the at least one solder flow pathway.

13. An apparatus according to claim 12, wherein the at least one solder flow pathway is a solder flow channel in the first plate, the solder flow channel having a path shape configured to allow solder to flow between the conductor in the first plate and overlapping portions of the conductor in the second plate.

14. An apparatus according to claim 12, wherein the at least one solder flow pathway is a solder flow channel having a serpentine path shape about portions of channels in the joint region of the first plate.

15. An apparatus according to claim 12 further comprising a gasket disposed around the joint region.

16. An apparatus according to claim 11 further comprising:
solder of a first type disposed in the one or more channels of the first plate to provide an electrical and mechanical connection between the HTS and walls defining the channels in which the HTS is disposed; and
solder of the first type disposed in the one or more channels of the second plate to provide an electrical and mechanical connection between the HTS and surfaces defining the channels in which the HTS is disposed.

17. An apparatus according to claim 16 further comprising a solder of a second type disposed in the one or more channels in the joint region of the first plate to provide an electrical and mechanical connection between the HTS in the first plate and the HTS in the second plate.

18. An apparatus according to claim 17, wherein the solder of the first type has a melting point which is higher than a melting point of the solder of the second type.

19. An apparatus comprising:
a first plate having one or more channels provided in a surface thereof and having a joint region, the joint region having at least one solder flow pathway formed therein and wherein the first plate has openings therein through which solder may be introduced into the at least one solder flow pathway;
a high temperature superconductor (HTS) disposed in the one or more channels of the first plate;
a channel cap disposed over the HTS in the one or more channels of the first plate;
a second plate, having one or more channels provided in a surface thereof and having a joint region;
an HTS disposed in the one or more channels of the second plate; and
a channel cap disposed over the HTS in the one or more channels of the second plate,
wherein the second plate is disposed over the first plate such that the joint region in the first plate is disposed over the joint region in the second plate and at least a portion of one channel cap disposed in the one or more channels of the first plate contacts at least a portion of one channel cap disposed in the one or more channels of the second plate so as to form at least one electrically conductive path.

20. An apparatus according to claim 19 further comprising a gasket disposed around the joint region.

21. An apparatus according to claim 19, wherein the at least one solder flow pathway is a solder flow channel in the first plate, the solder flow channel having a path shape configured to allow solder to flow between the HTS in the channels of the first plate and HTS in overlapping channels of the second plate.

22. An apparatus according to claim 19, wherein the at least one solder flow pathway is a solder flow channel having a serpentine path shape about portions of channels in the joint region of the first plate.

23. An apparatus according to claim 19 further comprising:
solder of a first type disposed in the one or more channels of the first plate to provide an electrical and mechanical connection between the HTS and walls defining the channels in which the HTS is disposed; and solder of the first type disposed in the one or more channels of the second plate to provide an electrical and mechanical connection between the HTS and surfaces defining the channels in which the HTS is disposed.

\* \* \* \* \*